May 1, 1956

M. WATTER 2,743,923

SHEET-HANDLING MEANS

Filed Aug. 15, 1952

INVENTOR
Michael Watter.

BY Maurice A. Creust

ATTORNEY

May 1, 1956 M. WATTER 2,743,923
SHEET-HANDLING MEANS
Filed Aug. 15, 1952 15 Sheets-Sheet 2

INVENTOR
Michael Watter
BY Maurice A. Crews
ATTORNEY

May 1, 1956 M. WATTER 2,743,923
SHEET-HANDLING MEANS
Filed Aug. 15, 1952 15 Sheets-Sheet 3

INVENTOR
Michael Watter.
BY
ATTORNEY

May 1, 1956 — M. WATTER — 2,743,923
SHEET-HANDLING MEANS
Filed Aug. 15, 1952 — 15 Sheets-Sheet 4

*INVENTOR.*
Michael Watter.
BY *Maurice A. Creusé*
ATTORNEY

May 1, 1956 M. WATTER 2,743,923
SHEET-HANDLING MEANS
Filed Aug. 15, 1952 15 Sheets-Sheet 5

INVENTOR.
Michael Watter
BY
*Maurice A. Crews*
ATTORNEY

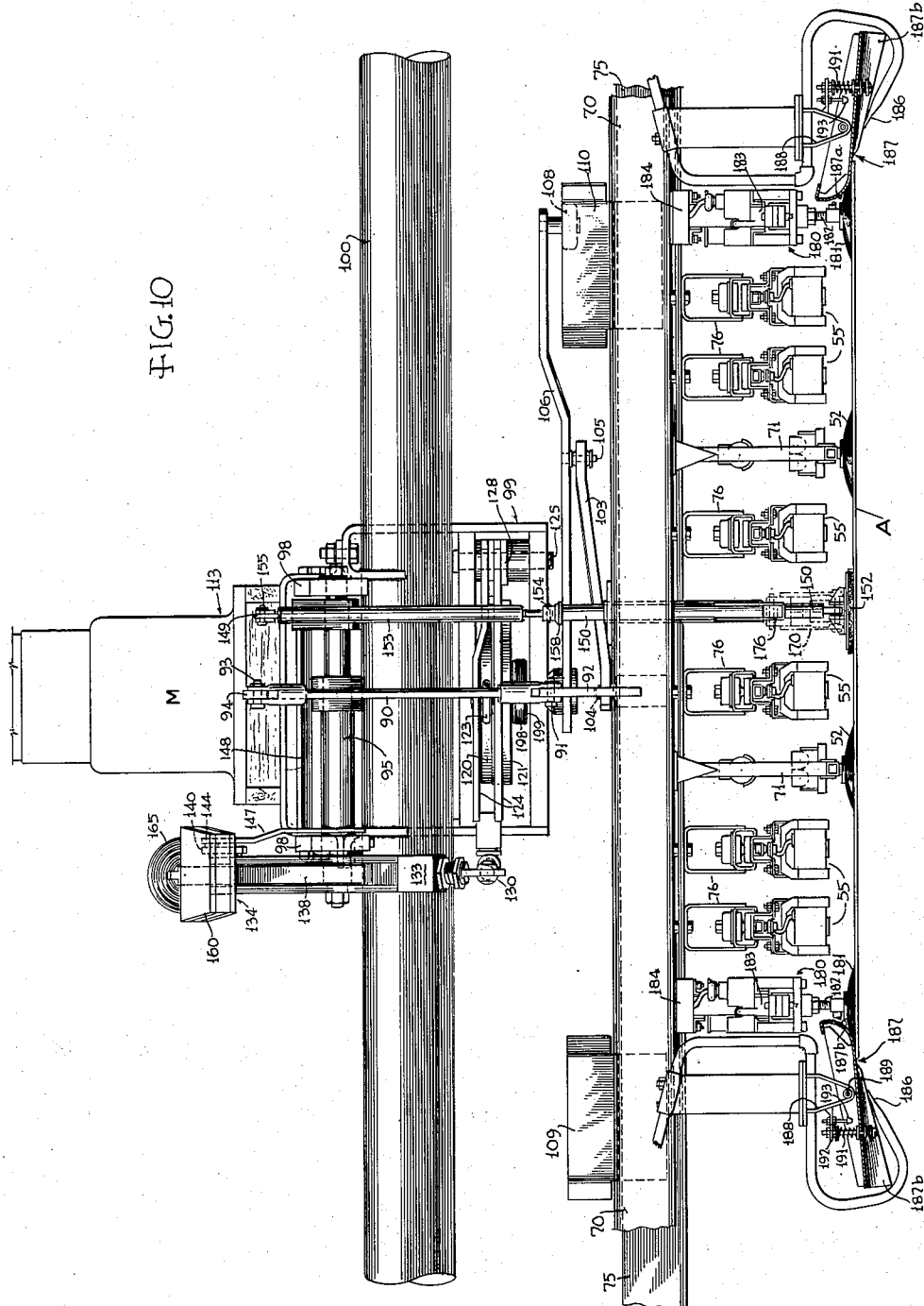

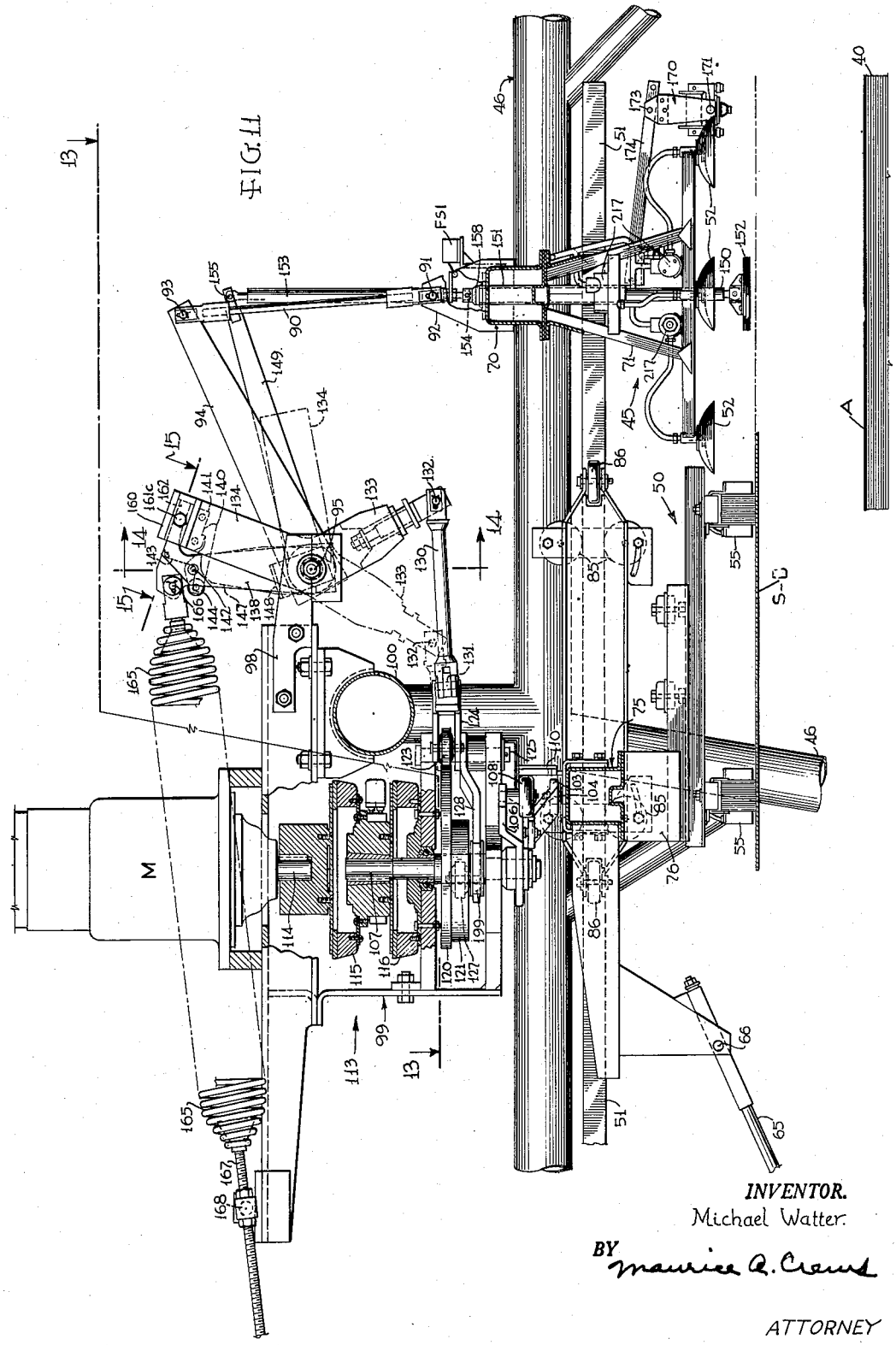

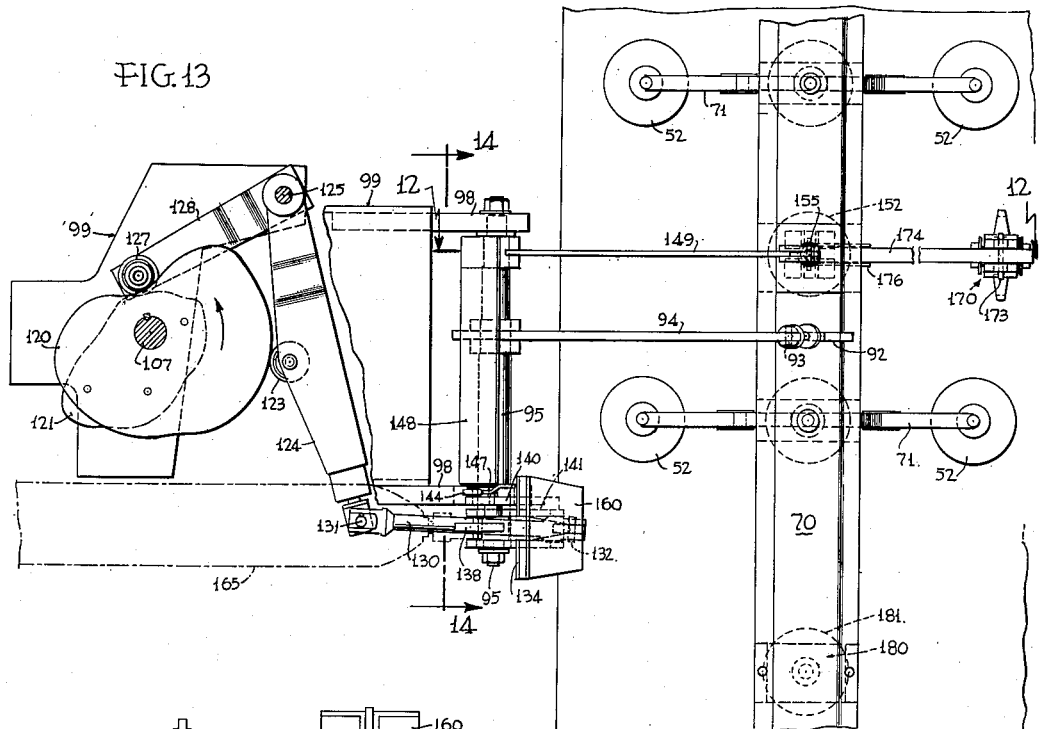
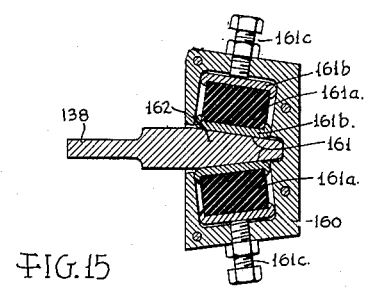
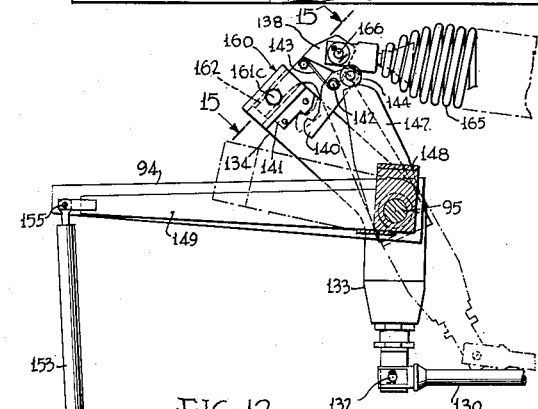
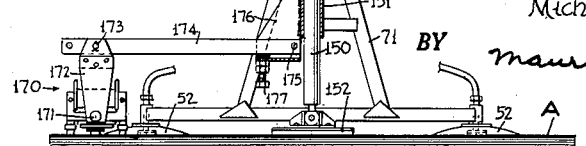

May 1, 1956 M. WATTER 2,743,923
SHEET-HANDLING MEANS
Filed Aug. 15, 1952 15 Sheets-Sheet 9
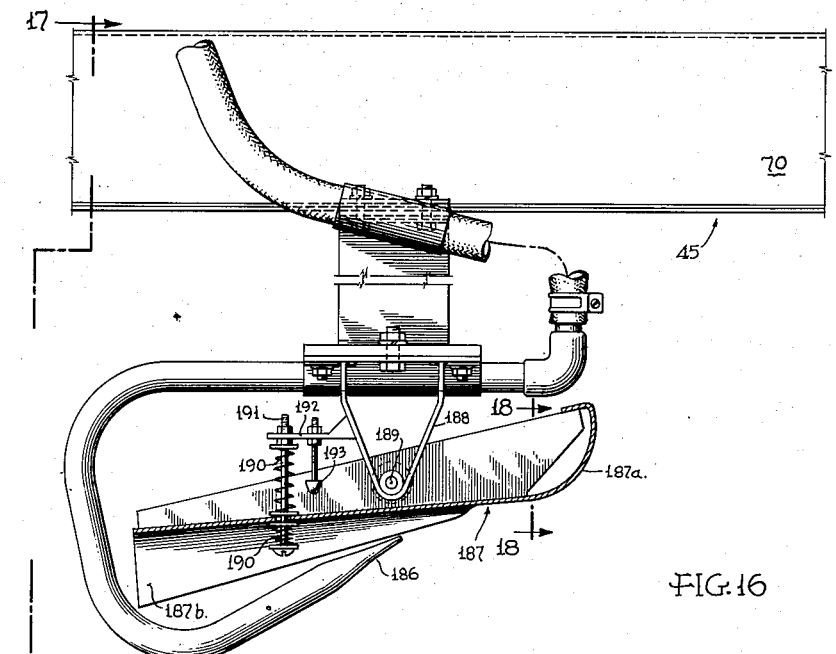
FIG. 16
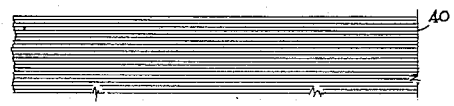
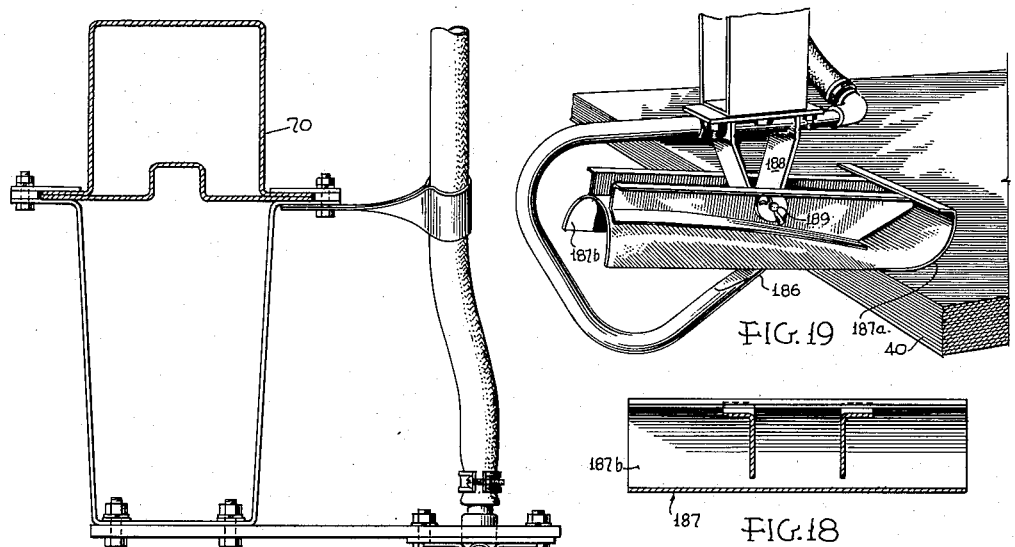
FIG. 19
FIG. 18
FIG. 17
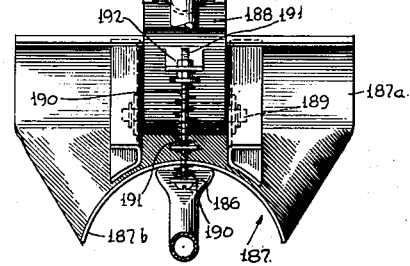
INVENTOR
Michael Watter.
BY Maurice A. Creus
ATTORNEY

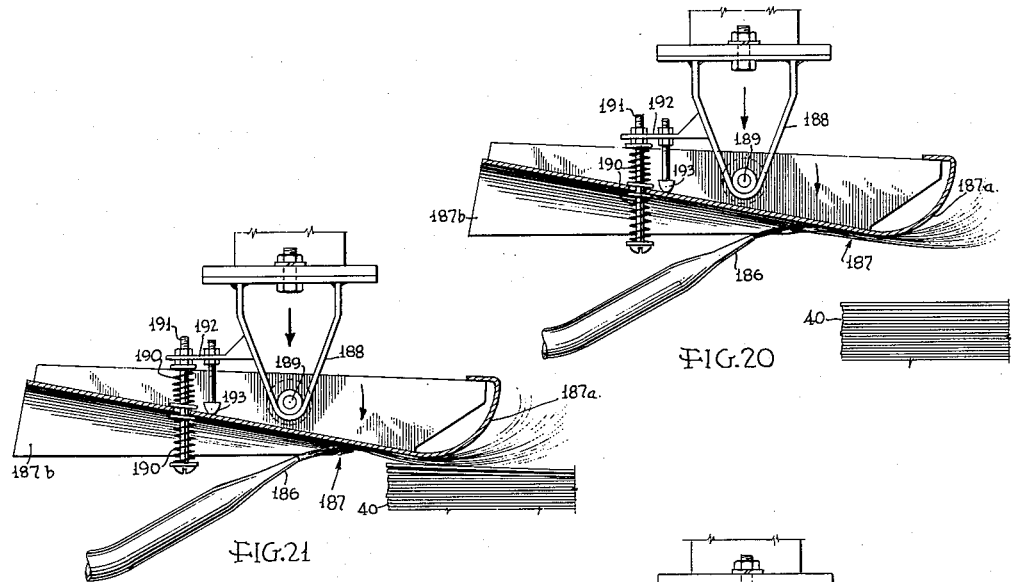
FIG.20
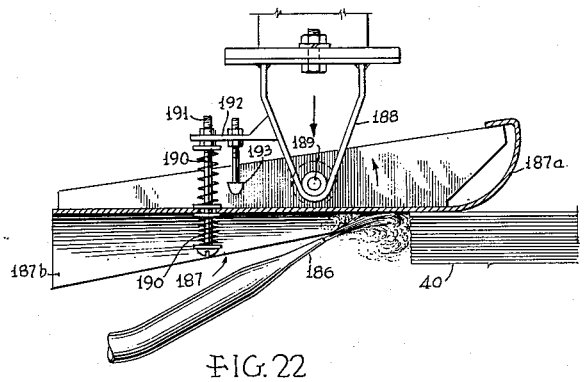
FIG.21
FIG.22
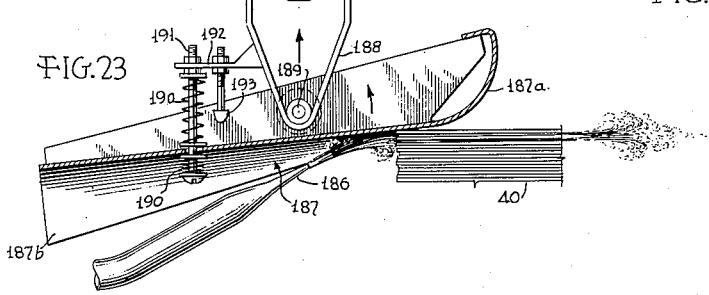
FIG.23
FIG.24
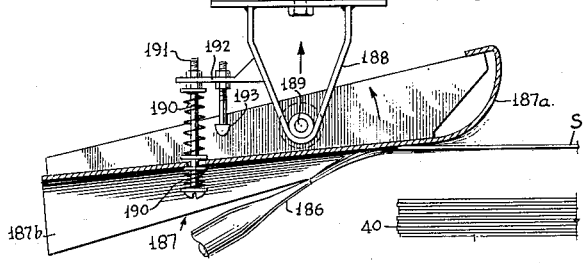
INVENTOR
Michael Watter.
BY Maurice A. Crews
ATTORNEY

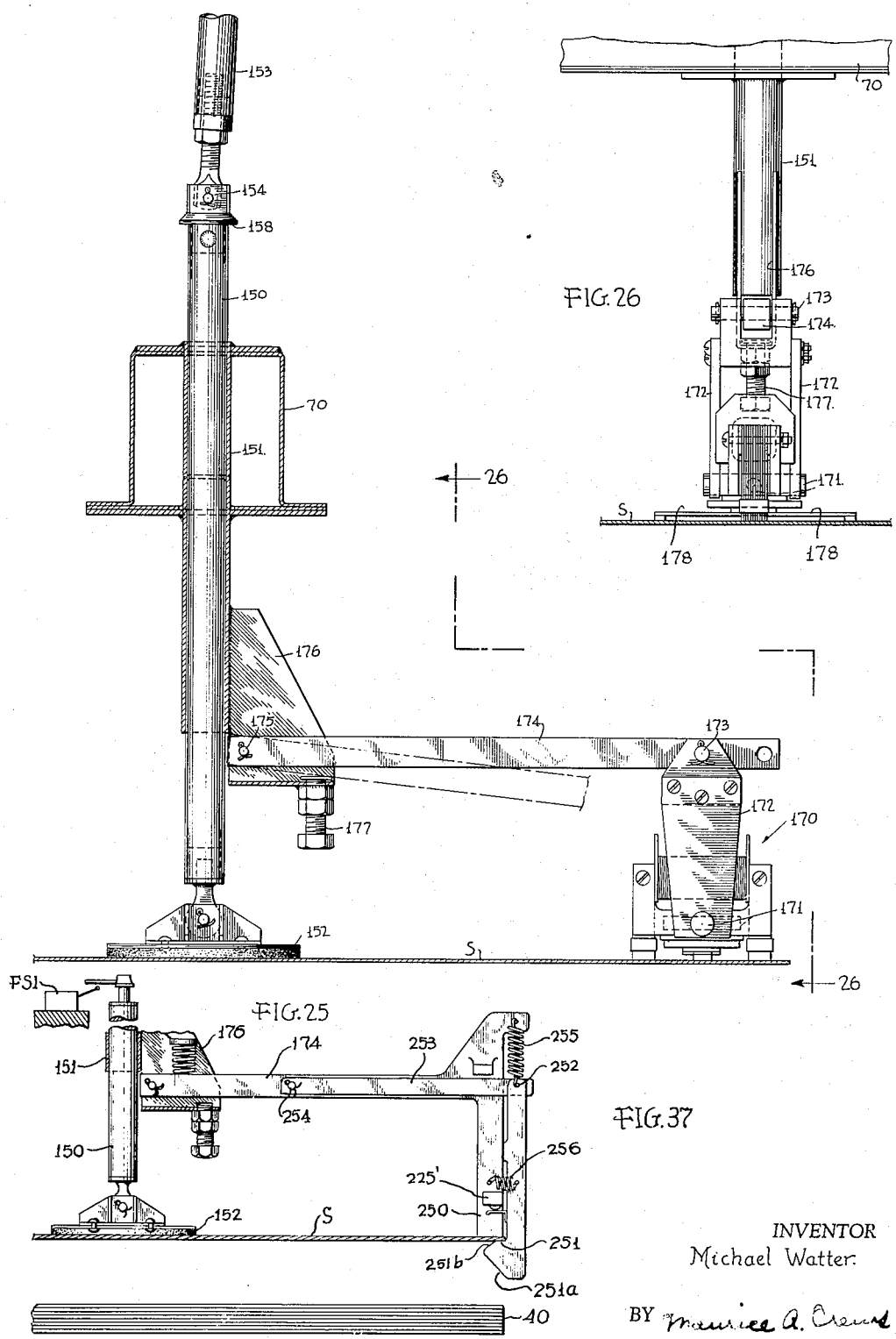

May 1, 1956 M. WATTER 2,743,923
SHEET-HANDLING MEANS
Filed Aug. 15, 1952 15 Sheets-Sheet 12

INVENTOR.
Michael Watter
BY Maurice A. Crew
ATTORNEY

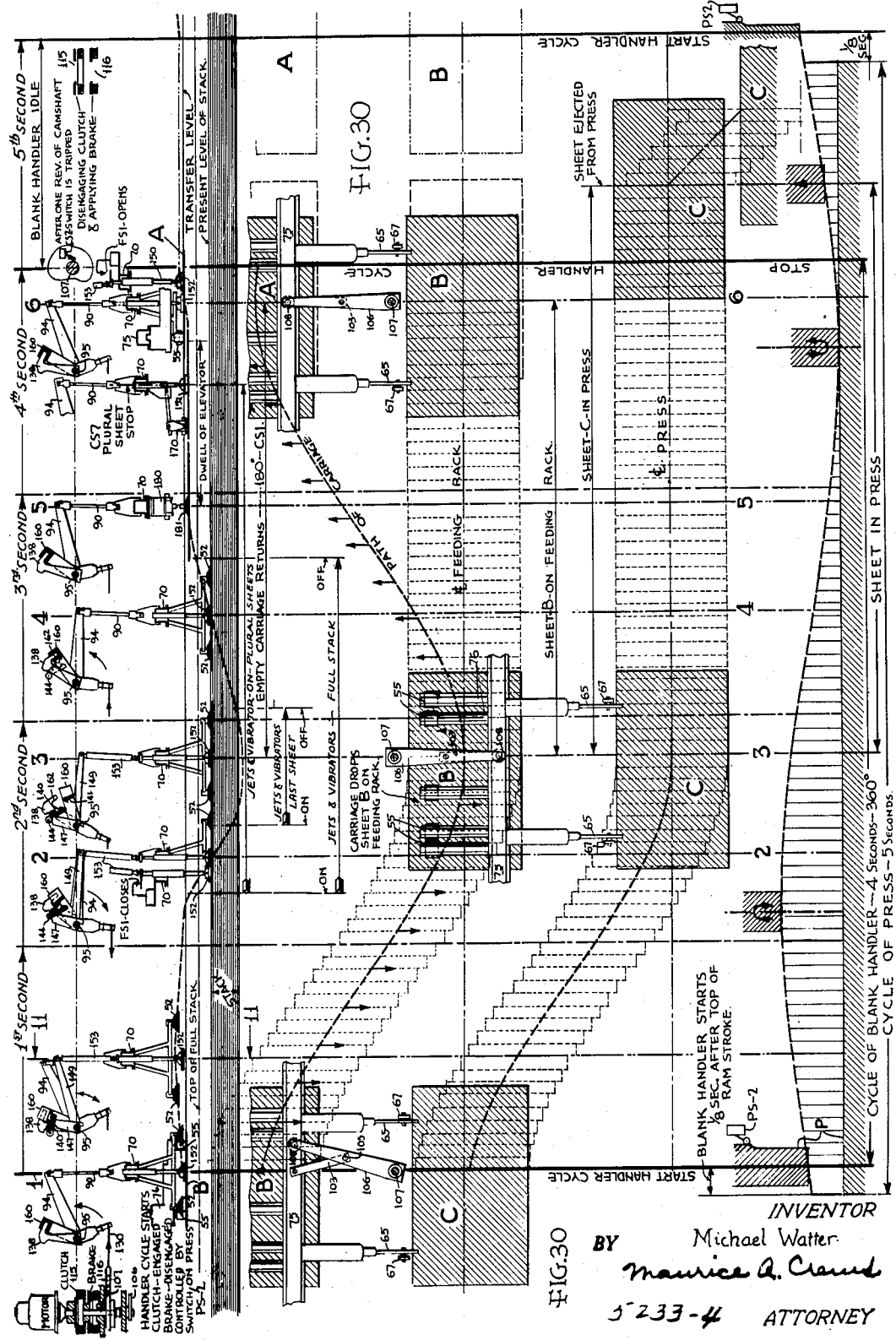

May 1, 1956      M. WATTER      2,743,923
SHEET-HANDLING MEANS
Filed Aug. 15, 1952      15 Sheets-Sheet 14
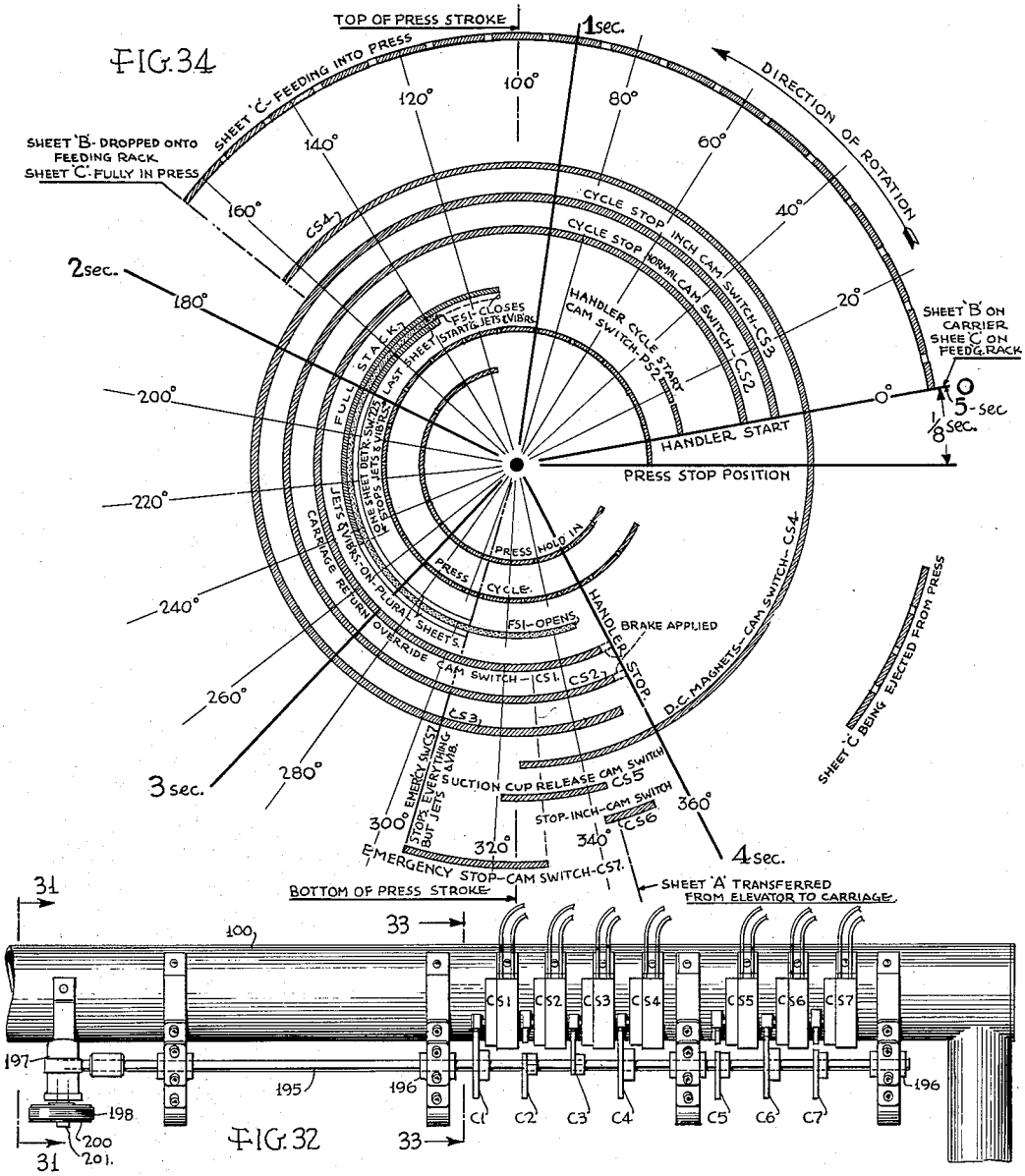
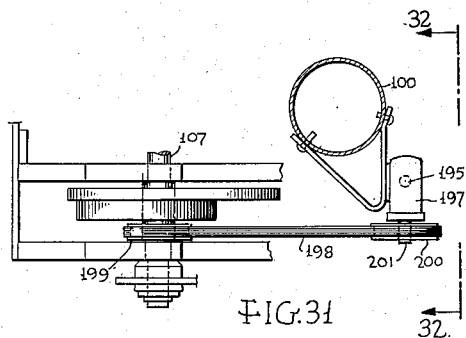
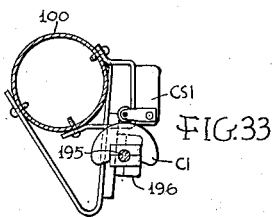
INVENTOR.
Michael Watter.
BY
ATTORNEY

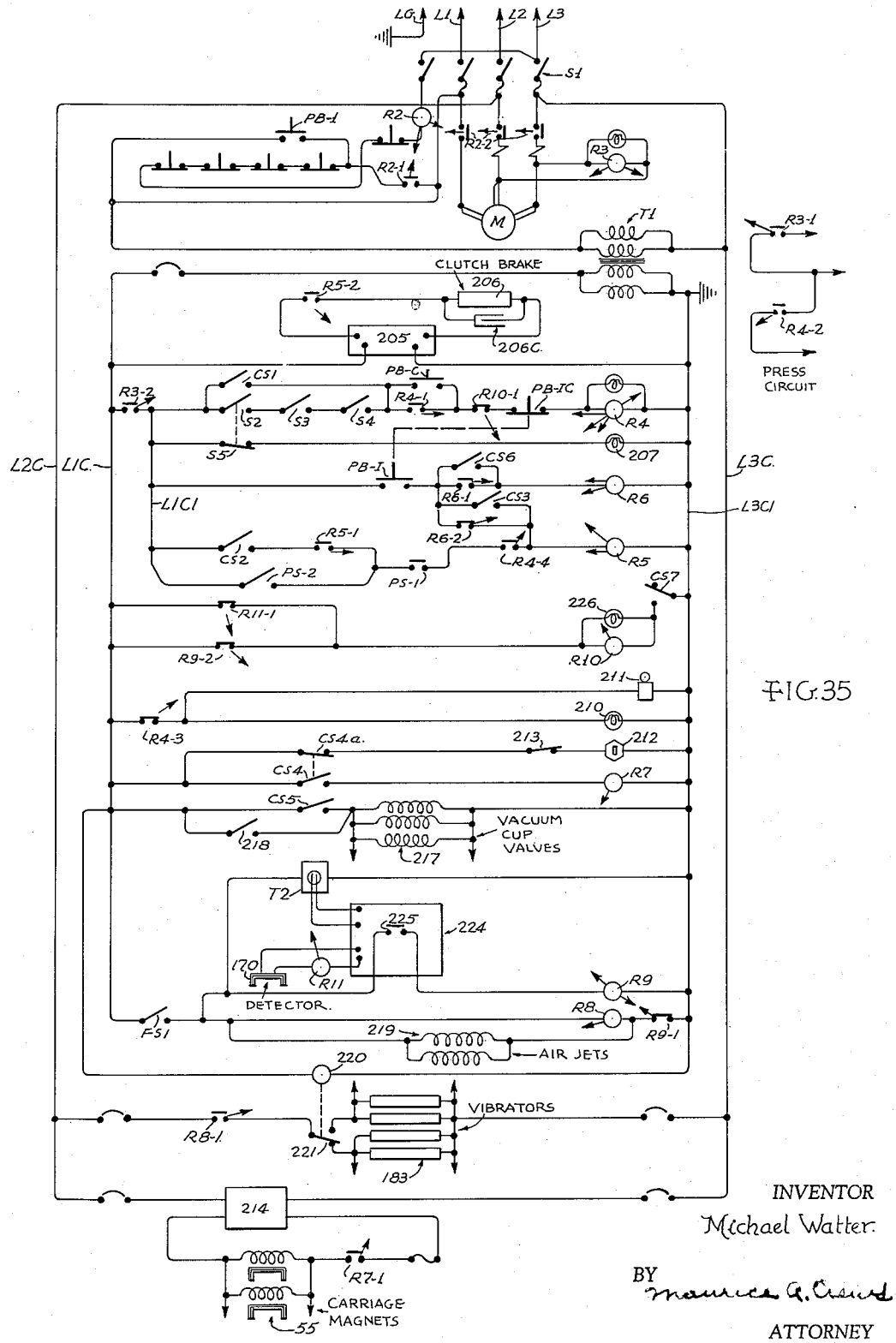

United States Patent Office 2,743,923
Patented May 1, 1956

2,743,923

SHEET-HANDLING MEANS

Michael Watter, Philadelphia, Pa., assignor to The Budd Company, Philadelphia, Pa., a corporation of Pennsylvania Application August 15, 1952, Serial No. 304,578

26 Claims. (Cl. 271—18)

This invention relates to sheet-handling means, particularly to sheet-separating and feeding means, and has for an object the provision of improvements in this art. The invention has been developed in connection with the separation and feeding of sheets of material susceptible to magnetic flux, referred to herein as magnetic sheets, and will be illustrated and described in this connection but with the understanding that many phases of the invention have other uses, hence the invention should not be regarded as limited in all respects to use for handling magnetic sheets.

One of the principal objects of the invention is to provide means for positively assuring that only a predetermined sheet charge thickness is forwarded from the sheet take-off means. Commonly only one sheet is desired—possibly two in some cases—and if a press or other sheet-working machine is designed to act upon only a given sheet thickness, it will be appreciated that serious damage may result if more than the desired sheet thickness is fed in.

Another object is to provide means for removing extra sheets from those taken from a stack when more than the desired number is detected to have been taken, and to separate sheets which stick to those desired to be taken.

Another object is to provide means for stopping the feeding mechanism if the desired number of sheets is not separated from the stack or from excess sheets taken from the stack.

Another object is to provide improved means for separating sheets by a fluid, such as air, and means for vibrating the sheets to assist in their separation.

Another object is to feed sheets without pulling them across the surface of sheets remaining in the stack, thus avoiding scratching or otherwise marring the sheets.

Another object is to feed sheets, preferably without bending them excessively, thus avoiding creases in the stock fed forward to a processing device.

Another object is to feed sheets from a stack which is held at a fixed bottom level until all sheets have been taken, thus avoiding the complex mechanism required for raising a stack in successive increments and saving the time necessary for returning the stack elevator to initial position to receive a new stack of sheets after all sheets in a stack have been fed.

Another object is to provide means for feeding a charge forward when it is assured that one sheet—and a full-sized sheet—is being held by the sheet transfer means and for bringing the apparatus under the safety control of such means.

Another object is to provide improved means for separating sheets by a fluid blast.

Another object is to provide improved means for operating a sheet transfer carriage.

The above and other objects and advantages of the invention will be apparent from the following description of an exemplary embodiment, reference being made to the accompanying drawings thereof, wherein.

Figure 1:
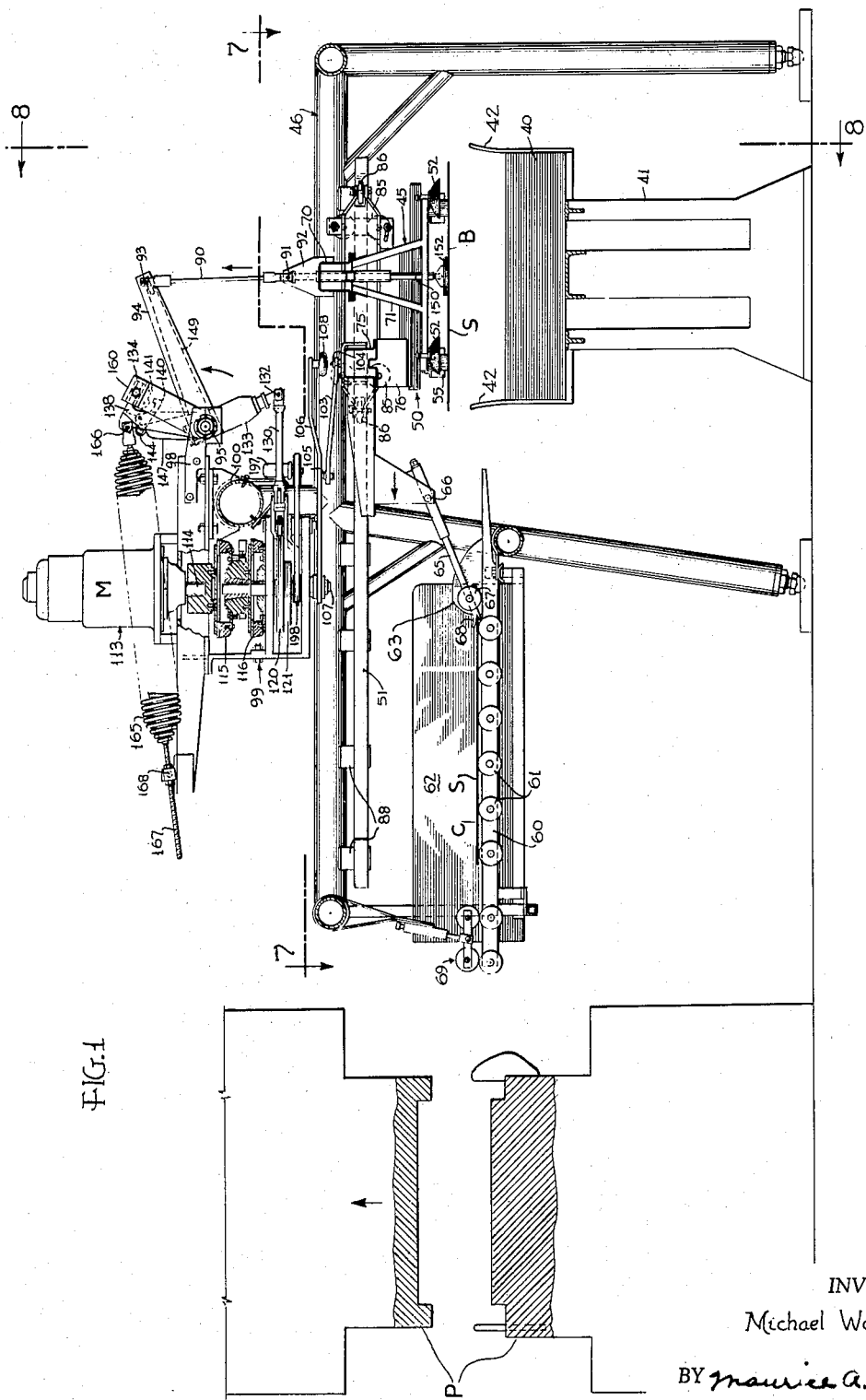
Fig. 1 is a longitudinal vertical section and elevation of apparatus embodying the invention, the view being taken approximately on the line 1—1 of Fig. 7 and showing the position of parts subsequent to shifting a sheet to the transfer carriage, the stage in the operating cycle being indicated by the vertical line designated by the heavy numeral 1 at the top left side of Fig. 30.
Figure 2:
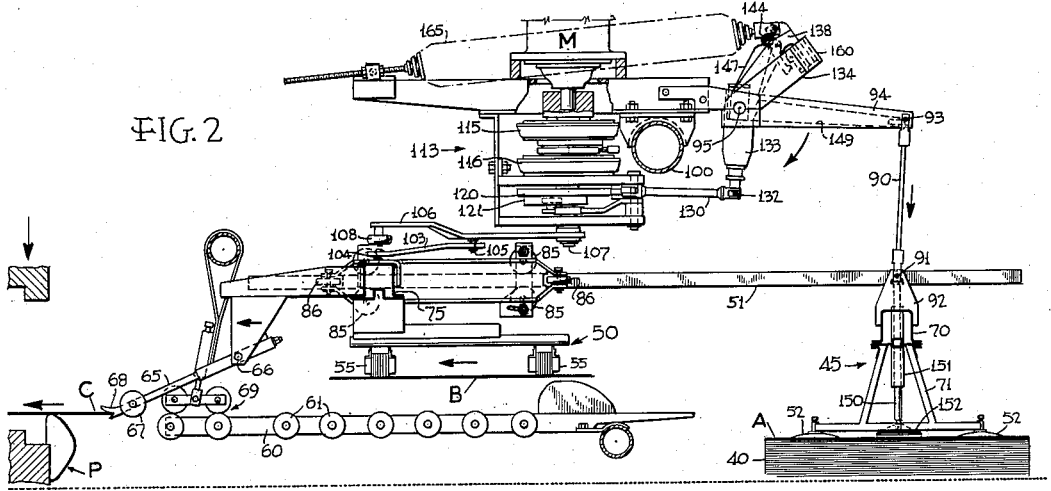
Fig. 2 is a vertical section similar to Fig. 1, but with some parts omitted, to show a stage in the operations shortly after the pick-up mechanism has first engaged the top of a stack of sheets, the stage in the operating cycle being indicated by the vertical line designated by the heavy numeral 2 at the top of Fig. 30.
Figure 3:
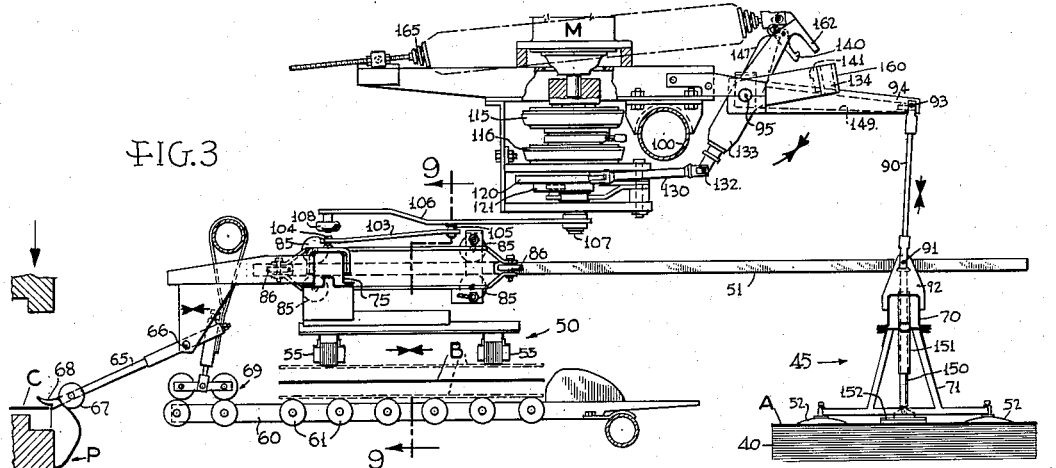
Fig. 3 is a vertical section similar to Fig. 2, showing the position of parts during the over-stroke of the pick-up mechanism while the transfer carriage is delivering one sheet to a processing device, such as a press, and dropping another sheet on the transfer table, the stage in the operating cycle being indicated by the vertical line designated by the heavy numeral 3 at the top of Fig. 30.
Figure 4:
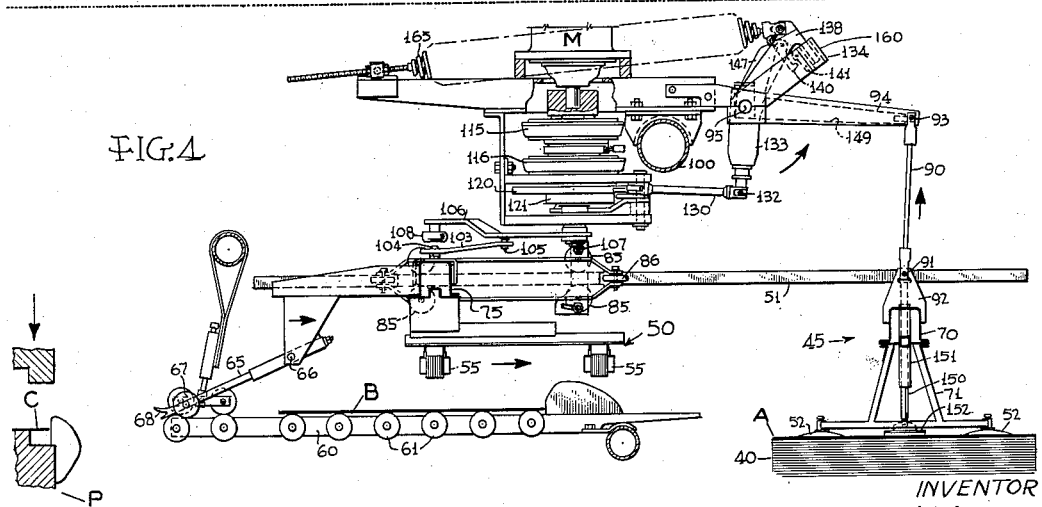
Fig. 4 is a vertical section similar to Fig. 2, showing the position of parts at the beginning of the sheet pick-up movement, the stage in the operating cycle being indicated by the vertical line designated by the heavy numeral 4 at the top of Fig. 30.
Figure 5:
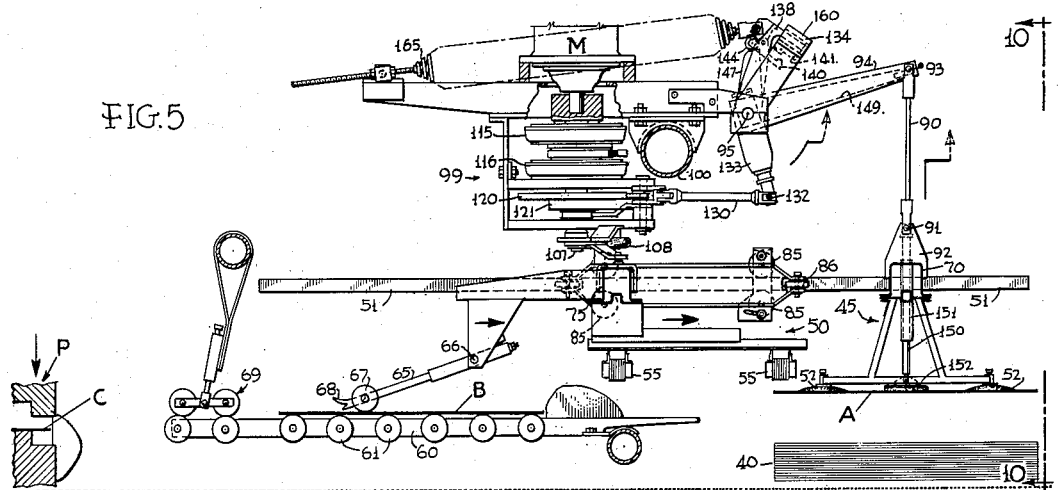
Figure 6:
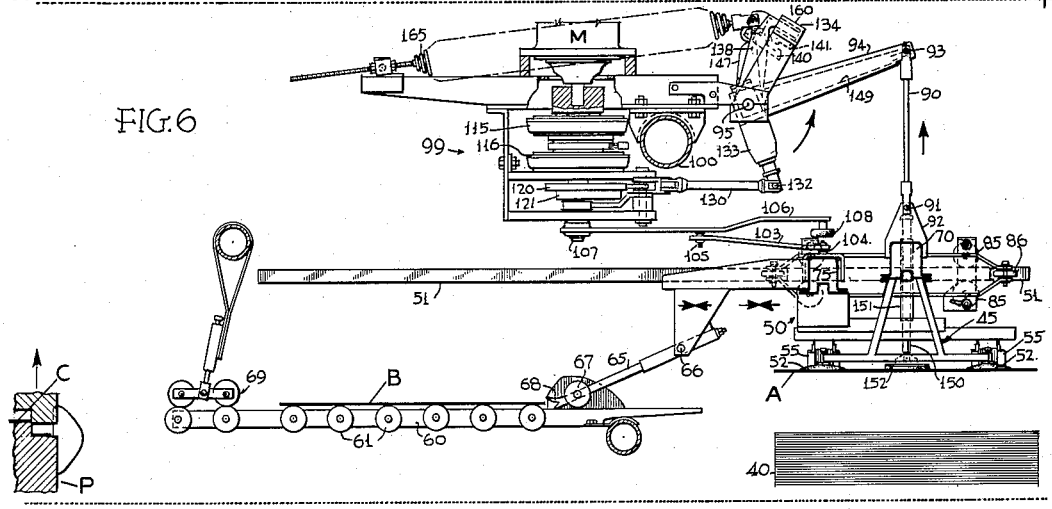
Figure 36:
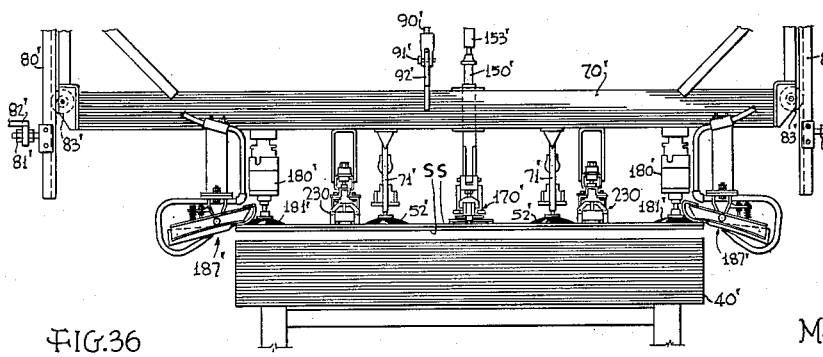
Figure 7:
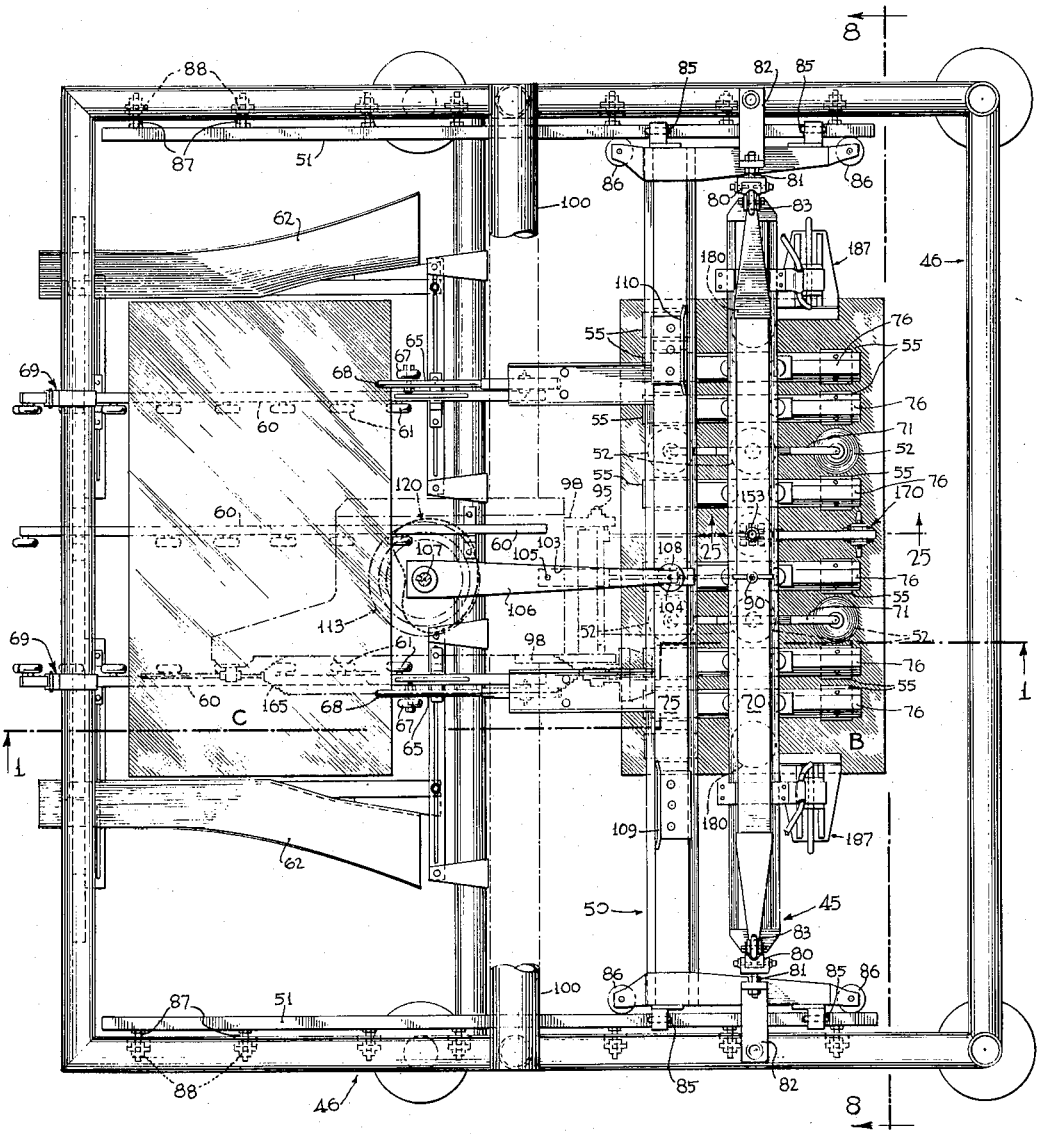
Figure 8:
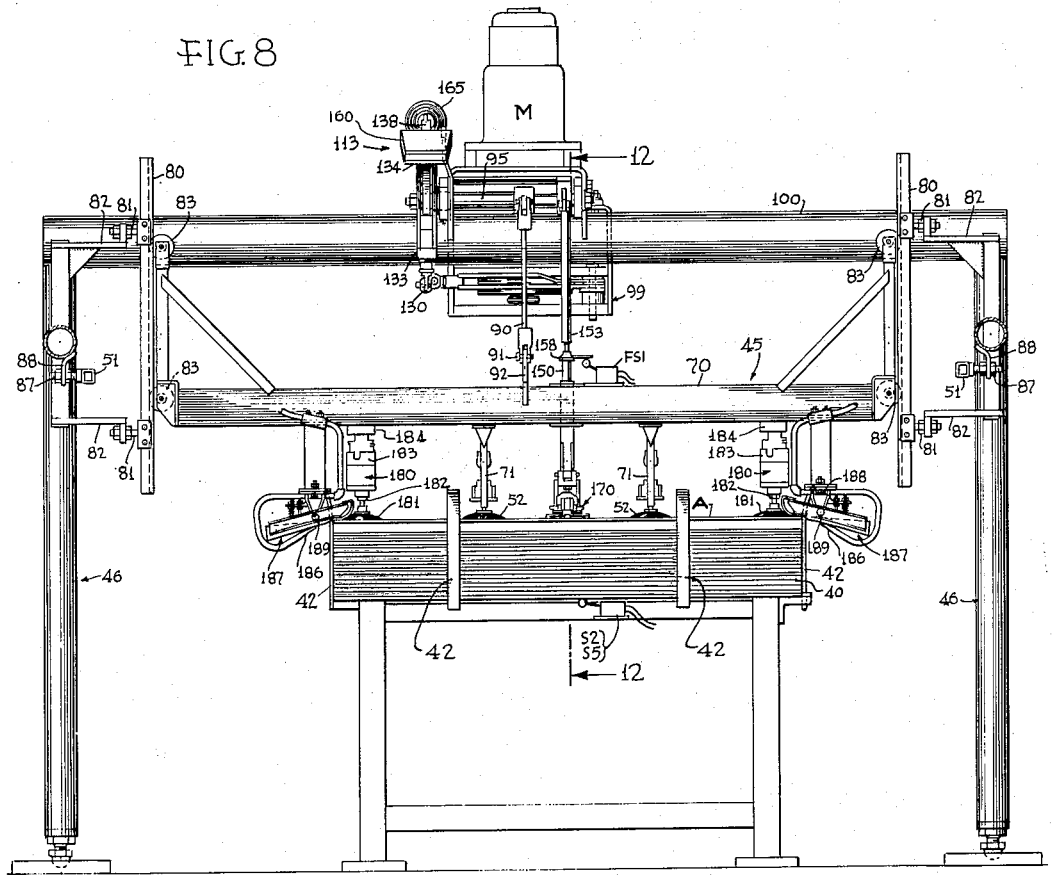
Figure 9:
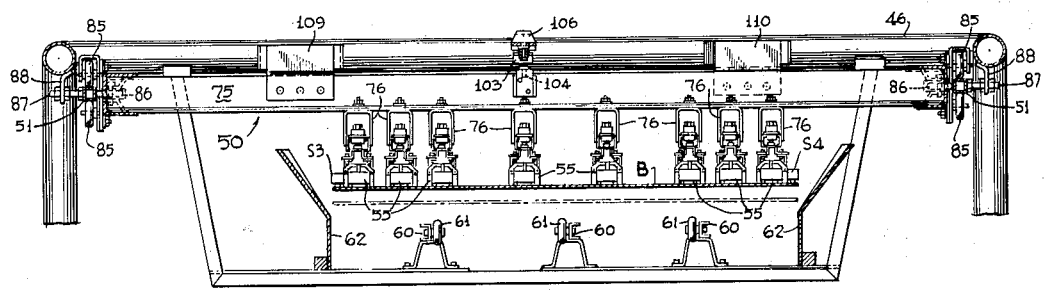
Figure 27:
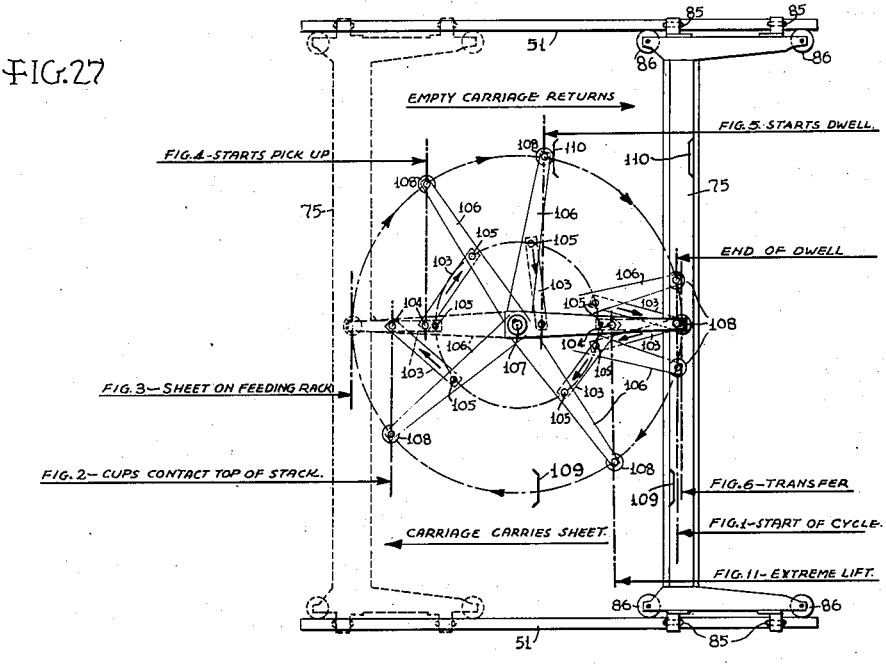
Figure 28:
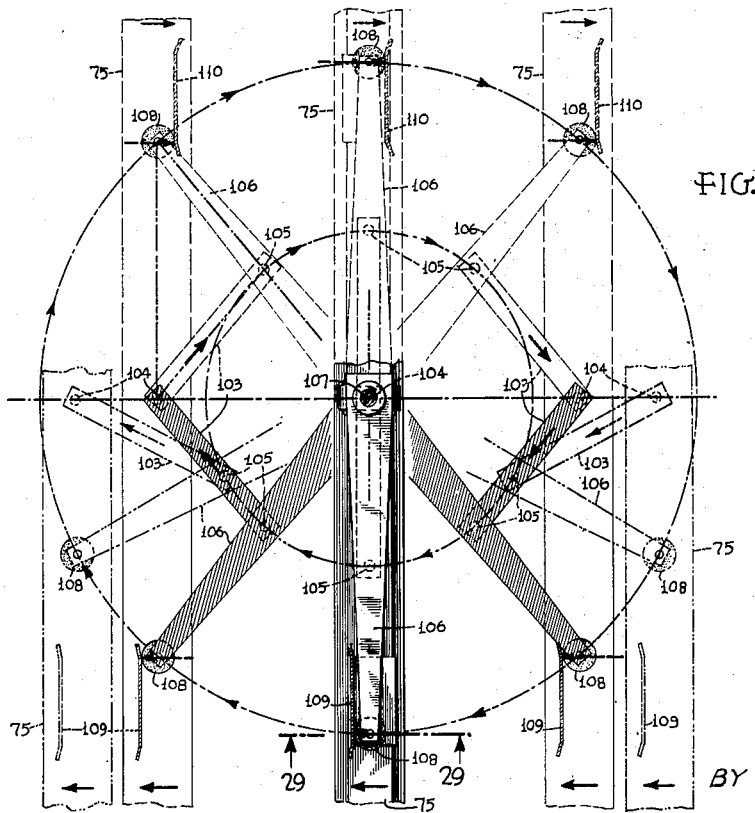
Figure 29:
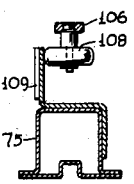

Fig. 5 is a vertical section similar to Fig. 2, showing the position of parts when the sheet has been raised and halted in position prior to that where it is shifted to the transfer carriage, the sheet being acted on at this time to remove any excess sheets which may cling thereto and the sheet detector acting to control operations in response to an indication as to the number of sheets being held up, the stage in the operating cycle being indicated by the vertical line designated by the heavy numeral 5 in Fig. 30;

Fig. 6 is a vertical section similar to Fig. 2, showing the position of parts at the time when a sheet is shifted from the pick-up means to the transfer carriage, the stage in the operating cycle being indicated by the vertical line designated by the heavy numeral 6 in Fig. 30;

Fig. 7 is an enlarged top plan and section of most of the apparatus shown in Fig. 1, the view being taken approximately on the line 7—7 of Fig. 1;

Fig. 8 is a transverse vertical section and elevation taken on the line 8—8 of Figs. 1 and 7 but with parts in a different stage of movement;

Fig. 9 is a transverse vertical section and elevation taken on the line 9—9 of Fig. 3;

Fig. 10 is an enlarged transverse elevation taken on the line 10—10 of Fig. 5;

Fig. 11 is an enlarged transverse elevation and section taken on the line 11—11 of Fig. 30;

Fig. 12 is an enlarged partial elevation and section taken on the line 12—12 of Figs. 8 and 13;

Fig. 13 is an enlarged partial horizontal section and plan taken on the line 13—13 of Fig. 11;

Fig. 14 is a vertical section taken on the line 14—14 of Figs. 11 and 13;

Fig. 15 is an enlarged section of a detail taken on the line 15—15 of Figs. 11 and 12;

Fig. 16 is an enlarged vertical elevation and section of air blast sheet-separating means shown on the left-hand side of Fig. 10, the parts being shown at an earlier stage in the cycle than that of Fig. 10;

Fig. 17 is an elevation and section taken on the line 17—17 of Fig. 16;

Fig. 18 is a vertical section taken on the line 18—18 of Fig. 16;

Fig. 19 is a perspective elevational view of some of the parts shown in Figs. 16 to 18;

Fig. 20 is a view similar to Fig. 16 but showing the parts at a later stage in the cycle;

Fig. 21 is a view similar to Fig. 16 but showing the parts at a later stage than Fig. 20;

Fig. 22 is a view similar to Fig. 16 but showing the parts at a later stage than Fig. 21;

Fig. 23 is a view similar to Fig. 16 but showing the parts at a later stage than Fig. 22;

Fig. 24 is a view similar to Fig. 16 but showing the parts at a later stage than Fig. 23;

Fig. 25 is a vertical section and elevation showing a sheet-detecting, gaging, or selecting device, the view being taken on the line 25—25 of Fig. 7;

Fig. 26 is a right side elevation of the parts shown in Fig. 25, the view being taken on the line 26—26 of Fig. 25;

Fig. 27 is a partial schematic plan view showing the transfer carriage operating means seen in Fig. 7, the heavy solid lines showing the parts in the Fig. 7 position and the light and broken lines showing the parts in other position;

Fig. 28 is a partial schematic plan showing the mechanical action of the carriage operating parts;

Fig. 29 is a vertical section of a detail, the view being taken on the line 29—29 of Fig. 28;

Fig. 30 is a composite diagram illustrating the interrelated operation of various parts;

Fig. 31 is an enlarged partial elevation and section of cam-operating parts shown in Fig. 1, the view being taken on the line 31—31 of Fig. 32;

Fig. 32 is an elevation taken on the line 32—32 of Fig. 31;

Fig. 33 is a vertical section taken on the line 33—33 of Fig. 32;

Fig. 34 is a circular timing diagram depicting the effects produced by the cams shown in Fig. 32 and other mechanisms;

Fig. 35 is a wiring diagram;

Fig. 36 is a view similar to a portion of Fig. 8 showing a modified lifting device; and Fig. 37 is a view similar in general to Fig. 25 but showing a micrometer or caliper gaging detector instead of an electro-magnetic detector.

The apparatus provided by the present invention, in general, comprises: (1) means for supporting a stack of sheets to be fed; (2) means for picking up at least one edge of one or more sheets, depending on how many are wanted at one time; (3) means for gaging the thickness of the sheets picked up for detecting whether the desired number or more than the desired number has ben taken; (4) means for separatnig excess sheets, if any, from those picked up and returning them to the stack; and (5) means for feeding forward the sheets picked up after full assurance has been given by the detecting means that the desired number and no more is being held away from the stack.

If only one sheet at a time is wanted it may be picked up by vacuum cups whether or not the sheets are of magnetic material. Magnets may be used to pick up magnetic sheets but care must be used to see that the magnets are critical in selecting the right number of sheets and no more. An associate of the present inventor has developed magnetic detecting means which is very critical in selecting one sheet and fairly critical in selecting two sheets, and a magnetic detector of this type is employed herein. This detector is disclosed in the copending application of Edwin S. Callender, Serial No. 320,028, filed November 12, 1952. The general principle of magnetic detection is well known, as see Innes 1,807,411, Lowenstein 2,116,119, Abbott 2,226,075, Kuehni 2,357,666 and others, for example. Herein the principle is used as one form of means for detecting the presence of an excess thickness of sheet charge for the control of other mechanisms. But it is not easy to provide such critical magnets for lifting sheets without using an undesirably great number because their lifting power is not great, hence, even when such magnets are used to provide for the picking up of more than one sheet, they are preferably used in conjunction with vacuum cups which engage the top sheet and which have sufficient lifting ability for all sheets picked up, the lifting magnets being used only for holding the lower sheet or sheets up against the bottom of the top sheet.

The gage means for detecting the number of sheets picked up acts as soon as the sheets have been picked up and while still in position for all excess sheets to be returned to the stack. Various means may be used for detecting the number of sheets picked up. Weight has heretofore been suggested as the criterion, see Hopkins 2,162,580 but preferably the thickness is tested. This might be tested by mechanical caliper means or the like, see Darbaker 1,911,884, Smith 2,142,536, and others, but preferably an electro-magnet, developed by the associate mentioned above, is used. To avoid time penetration by magnetic lines of force and to achieve the desired critical response to thickness, an electro-magnet employing alternating current is used. It is necessary here to know only that the electro-magnet which has been developed is sufficiently critical to provide complete assurance that the desired thickness or number of sheets and no more is taken.

The means for separating excess sheets preferably comprises means to force a fluid, such as air, under pressure between sheets to produce their full separation. Additionally, they may be vibrated. Herein there is shown a sheet-engaging vacuum cup vibrated by power means, such as an A. C. solenoid, as one of the vibrating devices; and the air-separating means is an improved device provided according to the present invention which also provides vibration of the sheet.

The sheet-separating means is preferably made subject to control by the detecting means. Specifically, the means disclosed herein provides that the sheet-separating means will go into action each time a sheet or sheets is lifted from the stack, and its action is discontinued only after the detecting means has given an indication that the desired number of sheets and no more has been taken from the stack. After a predetermined lifting movement has occurred, the machine feeding and processing actions are stopped and a warning signal given if the desired number of sheets has not been separated from unwanted excess sheets. However, the sheet-separating means will continue their action, and when excess sheets are separated, normal operations can be resumed. Means are also provided for stopping the feeding action of the machine when no sheet is present on the sheet-transfer means for forwarding sheets to a processing machine, such as a press.

As shown in Fig. 1, the sheet-handling machine takes sheets S from a stack of sheets 40 and feeds them to a die press P. At the beginning of operations a full stack of sheets 40 is placed upon a base support 41 of fixed height, and the sheet pick-up mechanism automatically adapts its movement to the height of the top of the stack, as will be more fully explained hereinafter. Stakes 42 may be provided for holding the edges of the stack.

The sheet-handling means in general, comprises sheet pick-up means, such as an elevator 45, which is mounted for vertical movement on a main support, such as a frame 46, and a sheet-transfer carriage 50 which is mounted for horizontal movement on the main frame 46, as along tracks 51 secured thereon.

It will be assumed that the machine handles single sheet thicknesses, and while more than one sheet in a plane could be handled without any material modification of the illustrated apparatus, it will be assumed also that only one sheet in a plane is taken.

In the first embodiment the sheet-engaging pick-up elements comprise vacuum cups 52 formed of some rubber-like material which will resist the action of the oil with which the sheets are usually coated for their preservation. There are enough vacuum cups to pick up at least a portion of the sheet in the first instance so that the sheet-detecting means can act on it to determine whether too many sheets have been lifted; and preferably, as illustrated, there are enough vacuum cups to pick up the entire sheet evenly.

After being lifted from the stack and after full assurance that only one sheet is being held, the sheet is transferred to holding elements 55 of the transfer carriage 50, these holding elements here comprising direct current electromagnets.

After being grasped by the holding elements 55 of the transfer carriage, the pick-up elements 52 are vented to relieve the vacuum and the elevator 45 is moved up higher to raise the vacuum cups above the sheet and the carriage begins to move the sheet away. This is the position of parts in Fig. 1.

The transfer carriage 50 with the sheet is moved laterally on the tracks 51 until the sheet carried thereby is located in proper position above an intermediate supporting transfer table 60, whereupon the magnets are de-energized and the sheet dropped. The table comprises sheet-supporting rollers 61 located at the proper height to pass the sheet to the press P. In Fig. 1 a sheet S is shown in the position where it has been dropped on the table 60. End guides, such as inclined plates 62, which may be adjustable, assure that the ends of the sheet are properly located.

Means are provided for moving a sheet from the table 60 to the press, the means here shown comprising pushers 65 pivoted at 66 to the transfer carriage and held up in a bottom position by stops near their pivots so as to have their outer ends located at the proper height to fairly engage the rear edge of a sheet on the table. The pushers are provided each with a roller 67 and a fork or notch 68 at their outer ends. The rollers 67 ride over a sheet on the return movement of the pushers, and the notched ends 68 engage the edge of a sheet to push it into the press. Adjustable resiliently-biased hold-down rollers 69 above the table keep the sheet in proper disposition as it is pushed into the press and control its forward movement so that it moves as pushed but does not have free movement. Positioning elements 63 with rounded edges are provided for placing the rear edge of a sheet correctly on the table for engagement by the pushers 65.

Referring especially to Figs. 7 and 10, elements of the pick-up elevator 45 and the transfer carriage 50 are required to intermesh in the transfer movement, and to provide for this the elevator 45 comprises a main support beam 70 which carries the suction cups 52 on a plurality of laterally spaced depending brackets 71; and the transfer carriage 50 comprises a main support beam 75 which carries the magnets 55 on a plurality of laterally spaced, longitudinally projecting, depending brackets 76. The cup brackets 71 and the magnet brackets 76 are interfingered with each other when the elevator is raised and the carriage is in the home position.

As shown in Figs. 7 and 8, the elevator 45 is mounted for vertical movement on guides or ways 80 adjustably secured, as by bolts 81, on brackets 82 carried at each end on the main frame, the elevator having guide rollers 83 engaging grooves in the facing edges of the ways.

As shown in Figs. 1 and 9, the transfer carriage 50 is provided with adjustably mounted upper and lower guide rollers 85 and edge guide rolls 86 operating on the tracks 51. The tracks are adjustably carried by bolts 87 from brackets 88 secured to the main frame.

As shown in Figs. 1 and 8, the elevator 45 is moved up and down by a connecting rod 90 attached at the lower end by a pivot pin 91 to an upstanding bracket 92 secured to the main beam 70 of the elevator and attached at its upper end by a pivot pin 93 to a lever arm 94 turnable about a jack shaft 95. The jack shaft is carried by brackets 98 secured to an auxiliary frame 99 carried by a heavy tubular beam 100 of the main frame 46.

As shown in Figs. 1, 7, 10, 11, 27, and 28, the transfer carriage 50 is moved back and forth by a connecting rod 103 secured at one end by a pivot pin 104 to the main beam 75 of the carriage and secured at its other end by a pivot pin 105 to a rotary arm 106 carried fast on the lower end of a vertical drive shaft 107. The arm 106 also carries a roller 108 at its outer end which cooperates with upstanding cam plates 109, 110 on the beam 75 for moving the transfer carriage past the central position when the connecting rod 103 does not have effective leverage for moving it. The mechanism provides a very long carriage stroke with a connecting rod which alone would give less than half of this stroke. This is possible because the connecting rod is of such length that its outer pivot 104 passes through the center of the shaft 107 when the cam action of roller 108 on plate 109 or 110 moves the carriage past its center position. By making the arm 106 twice as long as the connecting rod 103, the movements are such that the cams 109, 110 may be formed along straight lines instead of having a complex shape.

Referring to Figs. 1 and 11, the elevator and transfer carriage and their associated mechanisms are operated and controlled by an operating unit 113 mounted on the main frame beam 100. This operating unit 113 includes a drive motor M having a shaft 114 which is connectible with the drive shaft 107 by an electro-magnetic clutch 115. The shaft 107 is provided with an electromagnetic brake 116. The clutch-brake controls are associated in a usual manner so that when the clutch is thrown in the brake is released and vice versa.

Referring to Figs. 11-15, the elevator operating mechanism includes lifting and depressing cams 120 and 121, both carried fast on the drive shaft 107. Cam 120 drives a follower roller 123 carried by an arm 124 movable about a fixed axis 125, and cam 121 drives a follower roller 127 carried by an arm 128 which is also turnable about the same axis 125. The arms 124 and 128 are rigidly connected together to turn as a single lever unit. Effectively, the motion may be considered as equivalent to that which would be imparted to the outer end of arm 124 by a grooved cam acting upon a single cam follower.

A connecting rod 130 is attached at one end by a double-motion pin joint 131 to the outer end of arm 124 and at its other end is connected by a similar double-motion pin joint 132 to a lever arm 133 which is turnably mounted on the jack shaft 95 and which has rigidly secured thereto an upstanding lever arm 134. It will be noted in Fig. 14 that the arms 133 and 134, which together form a rigid single lever, are longitudinally divided in the middle at the bearing on the jack shaft 95.

To the jack shaft 95 between the divided portions of arms 133, 134 there is secured, as by a key, an arm 138, and at a distance therefrom along the shaft, there is also secured to the jack shaft 95, as by a key, the lever arm 94, which, as noted above, is connected to the elevator by the connecting rod 90.

Means are provided for permitting over-travel of the full-stroke positively-driven arm 134 relative to the elevator-moving arm 138 which must usually have a shorter stroke to accommodate for the height of a stack of sheets. This over-travel is provided in automatic response to the height of the stack of sheets by the following mechanism:

The arm 138 is provided with a latch 140 and the arm 134 is provided with a cooperating keeper 141. The latch is pivoted on the arm 138 upon a pivot pin 142 and is urged into keeper-engaging position by a spring 143. A cam roller 144 is carried on the outer end of the latch 140.

Adjacent the cam roller 144 there is disposed the cam end of a cam arm 147 which is turnably carried on the jack shaft 95 and rigidly connected by an axially-extending plate 148 with a feeler arm 149 which is also turnably mounted on shaft 95. A feeler rod 150 is slidably mounted in a vertical tube 151 carried by the elevator beam 70 and at its lower end carries a universally pivoted feeler foot 152. The feeler rod 150 is connected with the outer end of feeler arm 149 by a connecting rod 153 having ball pivot joints 154 and 155 with the rod and arm respectively The feeler rod 150 is provided with a collar 158 which rests on the upper end of the guide tube 151 as the elevator moves down (Fig. 11), but when the feeler foot 152 engages the top sheet of a stack (Fig. 12) and the elevator has been pushed down sufficiently to fully engage the resilient vacuum cups with the top sheet, the feeler causes the cam of cam arm 147 to engage the roller 144 and release the latch to salt the downward movement of the elevator while permitting the power arm 134 to continue its movement through a maximum stroke which would be long enough to cause the vacuum cups of the elevator to engage the last or bottom sheet of a stack.

On its return movement the arm 134 must pick up the elevator arm 138 to lift the sheet and this should be done without undue shock and noise. For this purpose the arm 134 is provided with a striker head 160 carrying a tapered resilient socket 161, and the arm 138 is provided with a mating tapered projection 162 which is engaged by the socket. The socket preferably comprises sandwiches of rubber 161a lined by metal parts 161b and adjusted by lock bolts 161c. The taper of the socket is preferably made to be approximately that of the friction angle so that energy is absorbed without rebound.

A heavy coil spring 165 connected at one end by a pin 166 to the elevator arm 138 and adjustably anchored at the other end by a rod 167 pivoted at 168, largely balances the weight of the elevator and sheet carried thereby.

It will be seen that on the upward movement the feeler foot 152 continues to rest on the sheet being lifted and the latch 140 is held open, but when the sheet is shifted to the transfer carriage and the elevator moves up further (Fig. 11), the feeler foot and rod drop and turn the cam arm 147 to release the latch and allow it to re-engage the keeper. The elevator is being held up by the socket and projection connection at the time the latch is re-engaged and, if necessary, the arms 134 and 138 may be forced together to insure re-latching.

Means are provided for detecting the thickness, character or number of sheets picked up from the stack and for giving an all-clear signal when the desired number and no more is detected. As shown in Figs. 25 and 26, the detecting means used herein is adapted to gage the sheet thickness and to do this from a positional location above the top of the sheet lifted.

The device used herein is an alternating current magnet 170 having applied thereto current of the proper frequency and other characteristics to saturate the desired sheet thickness but no more.

This magnet is mounted on a two-way pivot 171 located near the sheet surface, the pivot being carried by a frame 172 pivoted at 173 to an arm 174. The arm 174 is mounted on a pivot 175 carried by a bracket 176 secured to the side of the feeler tube 151. A lock bolt 177 forms an adjustable stop for limiting the lower position of the magnet. The low location of the magnet pivot 171 provides even seating of the magnet on the sheet even when the sheet may have considerable local unevenness. Lateral arms 178 prevent undue side tilting about the pivot 171. The pivot 173 provides for more general unevenness or tilting disposition of the top surface of the sheets.

The means provided herein for separating excess sheets from the desired pick-up load (one sheet, according to the first embodiment shown herein) comprises two types of devices, one whose function is to produce sheet separation by the action of a pressure fluid, such as air, with such vibration as may inhere in its operation, and the other whose function is to provide vibration to hasten separation.

The vibratory device will be described first. In the present embodiment, as shown in Figs. 8 and 10, there are a plurality of vibrating devices 180, each located near an edge of the sheet being picked up. Here a vibrating device 180 is mounted on the elevator 45 at each end of the sheet.

The vibrating device includes means for adherently engaging the top sheet on its upper surface, a suction cup 181 being illustrated, and means for vibrating the cup. The suction cup is secured to a vertically reciprocable rod 182 which here is connected to the core of an alternating current solenoid 183 mounted on a bracket 184 of the elevator. As shown, there is a positive pull both up and down by two solenoid elements but, if desired, one element may be made to serve, gravity or other means causing movement in the downward direction.

The fluid-separating means, as shown in Figs. 16 to 24, comprises an air nozzle 186 and a deflector plate 187; both mounted on a frame 188 carried by a bracket of the elevator 45. The deflector plate 187 is tiltably mounted on a pivot pin 189 and is normally held in an inclined position between springs 190 carried on a pin 191 secured at its upper end to a bracket 192 carried by frame 188. The deflector plate has some free movement between the springs 190. An adjustable stop pin 193 limits the upward movement of the rear end of the deflector plate.

The forward end 187a of the deflector plate 187 is formed to simulate the shape of an inverted convex airfoil and the rear end 187b is formed in the shape of an inverted gutter or trough. The end of the nozzle 186 is flattened and directed upwardly and inwardly so as to discharge a jet of air at high velocity toward and along the transversely curved airfoil-shaped portion 187a of the deflector, such aspirated air as is drawn in from behind the jet being confined on the sides by the inverted gutter portion 187b of the deflector. The end of the nozzle is located a short distance from the sheet edge for flexibility of action.

The airfoil end of the deflector plate normally assumes an elevated position as shown in Fig. 16, but when an air jet is delivered by the nozzle 186, it is pulled down toward the top of the stack, as shown in Fig. 20. As a consequence, when the airfoil end approaches the top surface of the top sheet of a stack as the elevator descends, a thin high-velocity stream of air passes between the end of the deflector plate and the sheet, as shown in Fig. 21, and this not only draws the end of the deflector plate down, as mentioned, but also tends to lift the edge of the top sheet according to laws of aerodynamic action.

Since the deflector plate and sheet have free relative movement, they may thus be drawn toward each other until they practically touch and thus greatly restrict the air stream between them, as shown in Fig. 22. This creates a sudden high pressure zone at the edge of the top sheet, and if the edges of the top sheet and adjacent sheets are not stuck together a blast of air is forced between them so that they are fully separated and the top one or more sheets floated on air, as shown in Fig. 23.

Since the deflector plate tends to move up and down due to air effects, there is set up a wave movement in the edges of the upper sheet or sheets and a flapping movement of the deflector plate which together produce periodic vibratory movements of sheet and plate and alternate periods of high and low air pressure at the edge of the sheets, with the result that there is a very efficient sheet separating effect. When to this there is added the mechanical lift on the top sheet and the shaking effect of the vibrators 180, which are located very close to the air deflector plates at each end of a sheet, the sheets are fully separated, as shown in Fig. 24, unless they are stuck together very strongly, say by rust, edge crimping, tar, or the like.

In the meantime, of course, the detector 170 is active and will not allow more than the desired number of sheets to be fed forward. When the desired number is detected and an indication thereof given, the machine controls are cleared for sheet-forwarding action. If the all-clear signal does not come soon enough to match the regular press action, the detector will cause the press and sheet-forwarding actions to be halted, but thereafter they may be started again upon their cyclic movements after the excess sheets have been removed.

The operation of the apparatus may now be followed by reference to the parts thus far described and by further reference to the cam mechanism shown in Figs. 31 to 33, to the general operating diagram shown in Fig. 30, to the circular timing diagram shown in Fig. 34, and to the wiring diagram shown in Fig. 35.

The cam mechanism shown in Figs. 31 to 33 comprises a cam shaft 195 mounted in bearing brackets 196 carried by the tubular cross beam 100 of the main frame 46. Shaft 195 is driven through a gear set 197 and a cog or sprocket belt 198 from the main drive shaft 107. The cog belt forms a positive drive connection between a cog or sprocket pulley 199 on the shaft 107 and a cog or sprocket pulley 200 on a depending shaft 201 of the gear set 197. The cam shaft is thus kept in step with the other driven mechanisms just as it would be with a sprocket chain or full gear drive.

The cam shaft carries fast thereon a number of cams— seven here, C1 to C7—which actuate a corresponding number of switches CS1 to CS7. The action of the cams and their switches will be described in more detail hereinafter; for present purposes, they may be identified as follows:

Cam C1 and its switch CS1 may be designated as the carriage return control means which cause the transfer carriage to return from its outer position near the press to its inner normal pause or home poistion above the stack. Other means are effective for assuring the feed-out movement of the carriage provided a sheet is carried thereby and further provided that there are sheets left on the stack.

Cam C2 and its switch CS2 may be designated as the normal cycle stop control means which cause sheet-handling operations to stop at the end of each cycle to await re-starting by interlocking control means on the press. Specifically, switch CS2 is actuated at the close of each cycle to cause actuation of the controls for the clutch-brake means 115, 116 of the main drive shaft 107 to disconnect the shaft 107 from the drive motor M and simultaneously to apply the brake.

Cam C3 and its switch CS3 may be designated as the inching cycle stop control means which has a function similar to that of the normal cycle stop control means C2, CS2 just described, but which functions independently of the press interlocks which are tied in with the normal cycle stop control means, as will be described.

Cam C4 and its switch CS4 may be designated as the carriage magnet control means which cause the carriage magnets to be energized and de-energized at the proper times in the cycle.

Cam C5 and its switch CS5 may be designated as the suction cup release control means which cause the suction cups on the elevator to be vented to the air to release the sheet to the carriage magnets. It is to be noted that the suction cups create their own vacuum when they are pressed against a sheet and no artificially created vacuum has been found to be needed, merely a release of the cup-created vacuum being needed.

Cam C6 and its switch CS6 may be designated as the inching re-cycling control means for causing the sheet-handling apparatus to stop after making one cycle when the inching push button is held in near the end of a cycle.

Cam C7 and its switch CS7 may be designated as the over-charge check and stop control means for stopping the sheet-handling apparatus and the press if, at a time before the start of a cycle, the sheet thickness detector has not given the all-clear signal. As noted, however, the sheet-separating means continues in action, and when the desired sheet charge or thickness is detected the operator can operate the cycle-start push button to re-start the cyclic operation. It is necessary to start the press by its own start button, as is the practice.

Referring now to the wiring diagram, Fig. 35, the motor M is shown at the top of the diagram to be supplied with three-phase alternating current by lines L1, L2, L3. A ground line LG is carried in the same supply cable. A multi-pole hand-throw switch S1 makes the main connection to the power cable. The immediate connection of power to the motor is made by a multi-pole relay switch R2–2 operated by a relay solenoid coil R2 which is energized when a motor start push button PB–1 is pressed in. The coil R2 locks in on its own switch R2–1, this lock switch being in series with a number of emergency stop push buttons in the usual way.

When the motor is started there is cut into circuit and energized an interlock control relay solenoid coil R3 which closes a switch R3–1 in the control circuit of the press. This insures that the press cannot be cycled unless the sheet-handling motor M is running. The relay R3 also closes a switch R3–2 in the sheet-handler control circuit to permit its automatic cycle controls to be operated, as will be explained hereinafter.

The lines L2 and L3 are extended in branch lines L2C, L3C for other purposes, to be noted, and lines L1, L3 supply low voltage alternating current (115 v., 60 cycle) to control circuit leads L1C, L3C1 through a transformer T1.

From lines L1C, L3C1 rectified A. C. current is supplied by a rectifier 205 to the D. C. operating mechanism 206 for the clutch 115 and brake 116 of the motor M. A flash quenching condenser 206C is provided for the switch of this mechanism.

Between the lines L1C and L3C1 there is provided a handler cycling circuit which includes a relay coil R4 and the switch R3–2 of the "motor-running" relay R3, already noted. A number of interlocking elements are included in the circuit of relay R4. Among these may be noted the switch CS1 of the cam C1, already described, and a cycle start push button PB—C. In parallel with the cam switch CS1 there is a stack switch S2 which is located beneath a stack of sheets (Fig. 8) so as to open when the last sheet is lifted, and two safety switches S3, S4 which are carried on the carriage in position to be closed when a sheet is present and held up by the magnets on the carriage, as shown in Fig. 9. Stack switch S2 is ganged with a switch S5 which closes, when the last sheet is taken, to light a warning lamp 207.

When relay R4 is energized it locks in at its own switch R4—1 in parallel with push button PB—C and in series with either the cam switch CS1 or the safety switches S2, S3, S4.

Relay R4, when energized, also closes a switch R4—2 in the cycle circuit of press P. This means that the press can be operated continuously without re-cycling as long as relay R4 remained energized. It is not necessary for present purposes to show more of the press controls since they are well known.

Relay R4, when de-energized, closes a switch R4—3 in an alarm circuit which includes a lamp 210 and a bell 211.

Relay R4, when energized, also closes a switch R4—4 in the circuit of a press interlocking relay R5.

In series with the relay R5 there is a press-running interlock switch PS–1 which is kept closed as long as the press control circuit remains energized. In series parallel with press switch PS–1 and relay R5 there is in one line a press-operated switch PS–2 which is closed at the start of each press cycle, and in the parallel line there is the cam switch CS2, already noted, and a lock switch R5—1 by which the relay R5 locks itself in circuit for each cycle after it has been energized through press switch PS–2. Switch PS–2 is shown in Fig. 30.

Relay R5, when energized, also closes a switch R5—2 in the circuit of the clutch-operating mechanism 206.

Relay switch R4—4 for R5 is in series with the press switch PS–1, hence the energization of the relay R5 is made dependent upon both the operation of the press and the safety elements which contribute to the energization of safety relay R4. However, it may be desirable to energize relay R5 and operate the clutch-brake mechanism 206 without reference to the operation of the press or this safety circuit of the sheet handler.

For this purpose an inching and one-cycle circuit is provided. This inching circuit is connected between a sub-line L1C1 inside "motor-running" switch R3—2 and L3C1 in parallel with the normal circuit of relay R5. It includes a one-cycle stop relay R6 having a self lock-in switch R6—1 in parallel with cam-operated switch CS6 and in series with the switch of an inching push button PB—I. The switch of push button PB—I is ganged with a normally closed push button switch PB—IC which opens the normal cycle circuit to relay R4 when the one-cycle or inching circuit is closed by PB—I.

Initially, the one-cycle relay R6 can only be energized if cam-operated switch CS6 is closed and will remain energized only if switch PB—I is held closed by hand. This causes the sheet-feeding apparatus to be stopped after one complete cycle, if the push button is held in, starting from a closed position of cam switch CS3 and ending with the opening of cam switch CS3 after the closing and opening of cam switch CS6.

Cam switch CS3 is placed in a line from push button PB—I to the clutch control relay R5, a normally closed switch R6—2 being arranged in parallel with switch CS3. Switch R6—2 is opened when R6 is energized. As will be seen from the circular cycle diagram, Fig. 34, cam switch CS3 is held closed at all times except near the end of the handler cycle; and cam switch CS6 is closed before switch CS3 opens to energize relay R6 which locks itself in on its switch R6—1 and opens switch R6—2. Then CS6 opens, still before CS3 opens, leaving relay R6 locked in on its switch R6—1 and holding R6—2 open.

The inching operation is as follows: If, at a time when cam switch CS3 is closed, the push button switch PB—I is closed, relay R5 will be energized and its switch R5—2 will close to energize the clutch solenoid 206 to cause the feeding apparatus to operate. This will continue as long as PB—I is held in and CS3 is closed and may be resumed at any time while CS3 is kept closed and before CS6 is closed. But CS6 is closed and opened to leave relay R6 locked in past CS6 and R6—2 held open, hence when CS3 is opened near the end of a cycle, relay R5 is de-energized, and the handler action stops. Inching or one-cycle operation may be repeated by releasing and again pushing in PB—I, switch R6—2 being re-closed when relay R6 is de-energized and serving to energize R5 when PB—I is again closed until the cam switch CS3 again is closed at the start of a new cycle.

Proceeding downward in the wiring diagram, Fig. 35, it will be seen that a switch CS4a is ganged with cam switch CS4 so as to be opened and closed once in each cycle to operate a counter 212 to indicate the number of sheets fed. A switch 213 may be opened when it is desired that there will be no count of the number of cycles of operation.

Closure of cam switch CS4 energizes a relay coil R7 which closes a switch R7—1 in the circuit of the sheet-holding magnets 55. Rectified D. C. current of the proper voltage is supplied to the magnets 55 from the alternating current source of L2C, L3C through a rectifier 214.

It has been noted that cam C5 and its switch CS5 release the vacuum on the sheet-holding suction cups 52 and 181. This is accomplished by energizing solenoids 217 (Fig. 11) each of which opens a valve to admit air for each cup. The valves close automatically when their solenoids are de-energized. A normally open hand switch 218 is provided to energize the solenoids independently of the cam switch CS5 to release the sheet from the suction cups whenever desired.

The means for vibrating the sheets picked up by the suction cups on the elevator and for supplying air jets to the deflector plate nozzles 186 are set into action as the suction cups are pressed against the top of a sheet. Specifically, as shown in Fig. 30, the feeler rod 150 closes a switch FS1 near the top of its upward movement relative to the elevator, and the closure of switch FS1 energizes a relay R8 which closes a switch R8—1 in the circuit of vibrator coils 183. Closure of feeler switch FS1 directly energizes the solenoid coils 219 of valves which admit air to the air nozzles 186. These valves close automatically when the solenoids are de-energized.

A motor 220, which may be referred to as a chopper motor, by operation of a switch 221, alternately supplies current to the upper and lower portions of the solenoid coils 183 to cause their solenoid cores and suction cups 181 to vibrate up and down rapidly. The same chopper motor action can be used to cause the vibrators to move out of phase at different locations on the sheet to impart a whipping action to the sheet.

As mentioned, the A. C. detector magnet 170 causes the vibrator and air jets to be stopped when the predetermined sheet thickness of sheet charge picked up (one sheet here) is detected. The detector 170 is shown to be connected with suitable means within a cabinet 224 supplied from a transformer T2, and when the desired sheet thickness is detected a switch 225 is closed. Specifically, the action is such that switch 225 remains open if there is present an excess over the predetermined sheet thickness. It has already been noted that switches S3 and S4 on the carriage and feeler switch FS1 on the elevator must be closed to indicate that at least one sheet is being held up on each the carriage and the elevator before the cycle can proceed. Closing of switch 225 energizes a relay R9 to open a normally closed switch R9—1 in the circuit of feeler switch FS1 and relay R8 to cause the vibrator coils 183 and the air jet valve coils 219 to be de-energized to stop the sheet vibration and the supply of air to the air nozzles 186.

Energization of relay R9 also opens a switch R9—2 in the circuit of a relay R10, a warning light 226, and the cam-operated "all-clear" switch CS7. Another normally closed switch R11—1 is held open by a relay R11 in the circuit of detector magnet 170 so long as the magnet is energized, specifically here, so long as FS1 is closed and current is supplied to the magnet.

If, at the time the all-clear switch CS7 is closed, say at about 75% of the upstroke of the elevator (about 305° on the handler cycle, Figs. 30 and 34), either of the switches R9—2 or R11—1 is found to be closed, indicating either that there is too great a sheet thickness yet held on the elevator or that the detector magnet is not operating, the relay R10 will be energized to open its normally closed switch R10—1 in the circuit of the normal cycle relay R4. This de-energizes relay R4 and it cannot be energized again until the detector magnet 170 is functioning and not even then until it indicates that the proper sheet charge thickness is being held on the elevator.

Of course, the closure of feeler switch FS1, showing that the feeler rod is being held up by a sheet prior to transfer of the sheet to the carriage, is made a prerequisite to the detector operations just described.

The normal cycle of operations will be described in connection with the parts-position diagram, Fig. 30, the time diagram, Fig. 34, and the wiring diagram, Fig. 35.

Fig. 34 shows that the handler cycle representing the movement of shaft 107 in making a complete revolution of 360° may, for example, take 4 seconds. The same figure shows that the press stroke takes a longer time or about 5 seconds. The top of the press stroke is placed at the top of Fig. 34 and the bottom of its stroke at the bottom of this figure. Because of the longer time taken for the press stroke, the handler must pause at some convenient position to wait for the press to complete its cycle.

Different sheets are identified as A, B, and C.

It is arranged that the handler will stop when the transfer carriage is in its home position over the stack and when the elevator is in the fully raised position with a sheet transferred to the magnets 55 of the carriage and held up by them. This position is indicated twice in Fig. 30, at the left at the heavy vertical line designated "Start handler cycle" and near the right at the line designated "Stop handler cycle." The handler pause time while waiting for the press is indicated at the top right of Fig. 30 by the designation "Blank handler idle," and the handler start line is shown again at the extreme right of Fig. 30.

Assuming that all conditions for a normal cycle are satisfied and relay R4 energized and locked in on its switch R4—1 and holding switch R4—4 closed, Fig. 35, the closure of press switch PS-2, as the press ram moves up, will energize relay R5 to close its switch R5—2 and engage the clutch (at 206) and release the brake. Relay R5 locks in on its switch R5—1 and cam switch CS2 so that a full cycle of the sheet handler is made. Fig. 34 shows that cam switch CS2 is kept closed until near the 4-second, 360°, "Handler Stop" position, and then opens to de-energize relay R5 to disengage the clutch and apply the brake. The parts, through inertia, move a short distance and stop approximately at the stop position.

It has been noted that the presence of a sheet on the carriage is made a prerequisite for the operation of the sheet handler. From Fig. 35 it is seen that the carriage magnets 55 are energized through the action of cam switch CS4, relay R7 and its switch R7—1. From Fig. 34 it is seen that cam switch CS4 is energized from a time just prior to the handler stop position to a time shortly prior to the 180° position when the carriage is in its outer position. Closure of cam switch CS4 causes closure of "sheet-present" switches S3 and S4 on the carriage, if a sheet is present and properly held by the carriage magnets; consequently the cycle relay R4 is energized to keep switch R4—4 closed so relay R5 may be actuated.

After the carriage magnets are de-energized by the opening of cam switch CS4, of course, the sheet will be dropped and the switches S3, S4 will open. It is, therefore, necessary to provide secondary means for keeping cycle relay R4 closed during the return stroke of the carriage until the end of the cycle.

For this purpose the cam switch CS1 is provided and Fig. 34 shows that its cam keeps switch CS1 closed from a time just prior to that at which switches CS4, S3, S4 are opened until the end of the cycle, that is, until after the magnets have picked up a new sheet from the elevator.

It wil be noted, Fig. 34, that the suction release cam switch CS5 has caused the cups to release the sheet at about the time the magnets pick it up, a short advance time being provided, as found necessary by trial, for the air to enter the cups, so they will not pull on the sheet as they move up above the transfer level where the sheet is held by the magnets.

The above description covers normal cyclic operations when the correct sheet charge thickness is detected at each cycle in time to have a sheet fed to the press within a proper cycle period of the press. The sheet-ejecting period and the sheet in-feeding period of the press are shown with appropriate legends in Fig. 34 for reference purposes. Fig. 34 shows that the all-clear cam switch CS7 is closed well before the end of the handler cycle (shown as closing at about 305° or about 75% of the upstroke of the elevator) and, if when switch CS7 is closed, it should find either switch R9—2 (excess sheet thickness present) or R11—1 (detector not working) closed, it will energize relay R10 to open switch R10—1 in the cycle circuit of R4, which will cause the handler to be stopped at once before the normal end of the cycle.

As mentioned before, at this emergency stop the air jets and vibrators remain active for separating excess sheets.

After excess sheets have been removed and the detector denotes that the proper thickness is present, switches R9—2 and R11—1 will be opened, and this will de-energize relay R10 to re-close R10—1 and re-establish the circuit to relay R4 except at PB—C; and when PB—C is pushed in, the cycle of the sheet handler and also of the press is re-established and normal operations are resumed when the press is re-cycled to cause operation of its cycle-starting switch PS-2.

Cam switch CS7 is re-opened before the beginning of a new cycle, so the detector will not give an effective cycle-affecting signal until the elevator drops to the stack, picks up a charge, and removes excess sheets or reaches the point where CS7 is closed without the excess sheets having been removed.

It has been noted that the closure of feeler switch FS1 as the elevator suction cups are engaged with a sheet causes the vibrators and air jets to go into action. Fig. 34 shows this and indicates that the starting time will vary with the height of the stack. The opening point of FS1 is always the same, namely, where the elevator rises above the sheet transfer level and the feeler drops down relative to the elevator. Normally the vibrators and air jets are stopped before switch FS1 is opened. From Fig. 35 it has been seen that as soon as the detector finds the right number of sheets to be present, it closes its switch 225, which immediately de-energizes the vibrators and air jets. This may occur at any time after a sheet is lifted from a stack. The end position would be at the time when the cam switch CS7 is closed to stop operations if too many sheets are present.

It will be noted from Fig. 30 that the elevator pauses or dwells at a height just before the position at which its sheet is transferred to the carriage magnets. This dwell is shown as being between the vertical lines designated 5 and 6. This provides time for excess sheets to be separated while the carriage is returning. It is during this dwell that the all-clear switch CS7 is closed.

The elevator has another pause or dwell in a higher position above the sheet transfer level, as is also shown in Fig. 30. The dwell in upper position lasts throughout the idling time of the sheet handler, as shown on the right of Fig. 30, and continues while the carriage moves over out of the way, as shown on the left of Fig. 30.

This completes the normal cyclic and detector-stop operations. The inching operations, when the normal cyclic prerequisites are not present, have already been explained.

Final items of interest in Fig. 34 are the press cycle line near the center when the press start cycle button is pressed and the press hold cycle line when the non-cyclic push button is held in. These lines represent the action of normal press controls and have no particular significance relative to the present invention; they are shown merely for reference purposes to assist in an understanding of the sheet handler cycle with relation to the press cycle.

It has been explained that means are provided, including the feeler switch FS1, the detector magnet 170, and cam switch FS7 and related parts, for stopping the apparatus if too many sheets have been picked up, and that means are provided, including the feeler switch FS1 and relay R8 and related parts, for causing the sheet vibrator and air jets to be set into operation. It will now be clear that if a sheet is not picked up the feeler switch FS1 will be re-opened as soon as the elevator starts upward, instead of at the time a sheet is transferred to the carriage in the normal cycle, and the circuit to the detector will be opened and its relay R11 de-energized with the same result as before noted, namely that switch R11—1 will be left closed, also that R9—2 will be left closed, and that the machine will be stopped as soon as the all-clear switch CS7 is closed at about 75% of the upstroke. The vibrators and air jets do not operate in this case after switch FS1 re-opens.

The modification shown in Fig. 36 departs from the first embodiment only in the provision of alternating current magnets 230 on the elevator in addition to the suction cups 52 and 181 for picking up sheets. All other parts are the same as before and are designated by the same reference numerals with a prime (') added.

The magnets 230 are supplied with alternating current having a frequency and other characteristics which cause them to be critical in picking up the number of sheets desired (2 here) while rejecting any additional sheets so that they may be shaken and blown off back to the stack. The magnets are energized when the vacuum cups are engaged with the top sheet and are de-energized when the vacuum cups are vented to the air to release sheets.

It will be clear that the vacuum cups preferably do most of the lifting and that the A. C. magnets cause the second sheet to be picked up with the top sheet upon which the vacuum cups can act.

Fig. 37 shows in a simple form how micrometer-switch devices could be applied to the present apparatus as suggested above. Essentially a micrometer with its switch in circuit disclosed herein (where switch 225 is shown) might be applied by hand each time a sheet is lifted; but since the machine is meant to be fuly automatic the detector should be mounted on the elevator as was the magnetic detector shown in Fig. 25.

In Fig. 37 the arm 174 carries a fixed part 250 of the gage and the mating movable part or jaw 251 is mounted on a pivot 252 carried by an arm 253 pivoted to the arm 174 at 254. The arm 253 is urged upward by a spring 255 and the jaw part 251 is urged toward the edge of sheet S by a spring 256. The jaw part 251 has a cam surface 251a which causes it to be pushed out by the edge of a stack of sheets when the elevator is lowered, and also has another cam surface 251b at the top to cause it to slide over the sheet or sheets picked up on the elevator. A switch 225' with adjustment for the number of sheets desired will close if the desired number of sheets (or less) is found between the jaws of the gage when the jaw 251 swings inward to bring the contacts together. If a sheet or sheets is shaken off the charge picked up, it will readily slide out of the jaws of the micrometer gage.

From the above description it will be seen that a very efficient sheet-handling device has been provided which can be relied upon to feed the desired number of sheets but no more and which will stop if the desired number is not taken. The quick shut-off of air and vibrator current in normal operations when the detector indicates that the correct charge has been taken, is very helpful in conserving compressed air and electric current.

Many other advantages will be apparent from a consideration of the features of the machine and its mode of operation.

The carriage operating means disclosed herein forms the subject matter of another application.

While certain embodiments of the apparatus have been specifically described for purposes of illustration, it is to be understood that there may be various embodiments within the broad limits of the invention.

What is claimed is:

1. Sheet-handling means comprising in combination, sheet-pickup means for adherently engaging and parting sheets from a stack of sheets and adherently holding the parted sheets in position for excess sheets, if any, to be returned to the stack, means, other than the lifting means, for detecting the number of sheets adherently held, and means for removing excess sheets, if any, from those which are held by said sheet-pickup means while still in position for excess sheets to be returned to the stack.

2. Sheet-handling means comprising in combination, sheet-pickup means for adherently engaging and parting sheets from a stack of sheets and adherently holding the parted sheets in position for excess sheets, if any, to be returned to the stack, and means, other than the lifting means, responsive to sheet thickness acting upon the parted sheets which are adherently held above the stack to give an indication of the number of sheets separated from the stack.

3. Sheet-handling means comprising in combination, sheet-pickup means for adherently engaging and separating sheets from a stack of sheets and adherently holding the separated sheets in position for excess sheets, if any, to be returned to the stack, and means, other than the sheet-pickup means, acting upon the separated sheets and responsive to the physical properties of the separated sheets for furnishing an indication when a predetermined number of sheets is held separated from the stack.

4. Sheet-handling means comprising in combination, sheet-pickup means for taking sheets from a stack of sheets, detecting means for gaging the number of sheets taken, means for removing excess sheets, if any, from those taken from the stack, means for starting said sheet-removing means into action when the sheet-pickup means engages a stack of sheets, and means responsive to said detecting means for stopping the action of said sheet-removing means when a predetermined number of sheets is detected.

5. Sheet-handling means comprising in combination, sheet-pickup means for taking sheets from a stack of sheets and holding them by adherent engagement above the stack, detecting means for gaging the number of sheets taken from the stack and for giving a control signal when the desired number is detected, and means subject to an action-regulating control by the signal of said detecting means for separating excess sheets, if any, from those taken from the stack.

6. Sheet-handling means comprising in combination, sheet-pickup means for lifting at least one edge of a sheet from a stack of sheets, detecting means for determining whether more than one sheet edge has been lifted, means for vibrating a sheet edge while lifted, and means for controlling the action of said sheet-vibrating means in response to an indication given by said sheet-detecting means.

7. Sheet-handling means comprising in combination, sheet-pickup means for lifting one edge of at least one sheet from a stack of sheets, magnetic means for detecting the number of sheets lifted, means for vibrating the lifted sheets, and means responsive to the action of said detecting means for stopping the action of said sheet-vibrating means when the predetermined number of sheets is detected.

8. Sheet-handling means comprising in combination, sheet-pickup means for lifting at least one edge of a sheet from a stack of sheets, sheet-rejecting means for mechanically and pneumatically acting upon the edge of the sheet which is lifted to separate it from excess adherent sheets, if any, and means responsive to the thickness of the sheet for stopping the action of said sheet-rejecting means.

9. Sheet-handling means comprising in combination, means for lifting a sheet from a stack of sheets, sheet-rejecting means acting upon an edge of the lifted sheet for separating it from excess adherent sheets, if any, said sheet-rejecting means including means for vibrating the sheet and means for directing a vertically confined jet of air at the sheet edge, and detecting means responsive in action to the number of sheets lifted for stopping the action of said sheet-rejecting means when the desired number of sheets is detected.

10. Sheet-handling means comprising in combination, sheet-pickup means for adherently lifting a sheet from a stack of sheets, means for adherently engaging an edge of the lifted sheet and for physically vibrating it, means for directing a jet of air between confining surfaces, including the sheet edge, adjacent said vibrating means, and detecting means responsive in action to the number of sheets lifted for controlling the action of said vibrating means and said air jet supplying means.

11. Sheet-handling means comprising in combination, means supporting a stack of sheets, lifting means for engaging and lifting the top sheet of the stack, drive means for pushing said sheet-lifting means against the top of the stack and for lifting it, said drive means having a stroke of movement sufficient to accommodate the full height of the stack, and over-travel means between the sheet-lifting means and drive means providing for stopping of the sheet-engaging means at any height of the stack and for over-travel of the drive means, said over-travel means including elements, other than the lifting means, for engaging the top of the stack and establishing positive drive between the sheet-engaging means and the drive means at all times except during the over-travel of the drive means.

12. Sheet-handling means comprising in combination, means supporting a stack of sheets, lifting means for engaging and lifting the top sheet of the stack, drive means for positively moving said sheet-lifting means up and down, a releasable and re-engageable connection between said sheet-lifting means and said drive means, and control means engageable with the top of the stack when said sheet-lifting means engages it for disengaging the connection to permit over-travel of said driving means.

13. Sheet-handling means comprising in combination, means supporting a stack of sheets, lifting means for engaging and lifting the top sheet of the stack, drive means for positively moving said sheet-lifting means up and down, said drive means having a stroke of movement of sufficient length to accommodate for the full height of the stack, and a releasable and re-engageable connection between said driving means and said sheet-lifting means which releases the drive means from the sheet-lifting means when the sheet-lifting means engages a sheet and which re-engages the drive means with the sheet-lifting means on the return movement of the drive means.

14. Sheet-handling means comprising in combination, means supporting a stack of sheets, lifting means for engaging and lifting the top sheet of a stack, drive means for positively moving said sheet-lifting means up and down, said drive means having a stroke of movement of sufficient length to accommodate for the full height of the stack, and a releasable and re-engageable connection between said driving means and said sheet-lifting means, said connection including a pair of arms turnable about a common shaft, one connected to said driving means and one connected to said sheet-lifting means, latch and abutment means between said arms, and means carried by said sheet-lifting means engageable with the top sheet of the stack for releasing said latch on the down stroke and permitting over-travel of the driving means, said abutment means re-engaging on the upstroke to raise the sheet-lifting means by said driving means.

15. Sheet-handling means comprising in combination, means supporting a stack of sheets, lifting means for adherently engaging and lifting the top sheet of the stack, separating means for applying a sheet-separating action to the sheet lifted from the stack tending to remove excess sheets which may adhere to it, and means actuated by engagement with the top sheet when engaged by said lifting means for starting the action of said sheet-separating means.

16. Sheet-handling means comprising in combination, means supporting a stack of sheets, lifting means for adherently engaging and lifting the top sheet of a stack, separating means for vibrating and blowing air against the edge of the sheet lifted, means actuated in conjunction with the engagement of said sheet-lifting means with the top sheet of the stack for setting said sheet-separating means into action, and detector means responsive to the thickness of the lifted sheet load for stopping the action of said sheet-separating means when a predetermined sheet thickness is detected.

17. Sheet-handling means comprising in combination, means for adherently supporting a sheet-pickup load of desired sheet thickness load, and means for detaching excess sheets, if any, from the pickup load, said sheet-detaching means including a pivoted plate having a curved airfoil-shaped end engageable with the top surface of the top sheet picked up, and a nozzle for directing a jet of fluid upward at an angle toward said plate and the edge of the sheet load, for the purpose set forth.

18. Sheet-handling means comprising in combination, means for adherently supporting a sheet-pickup load of desired sheet thickness load, and means for detaching excess sheets, if any, from the pickup load, said sheet-detaching means including a pivoted plate having a curved airfoil-shaped end engageable with the top surface of the top sheet picked up, and a nozzle for directing a jet of fluid upward at an angle toward said plate and the edge of the sheet load, for the purpose set forth, said airfoil plate having an inverted trough leading toward said airfoil-shaped end to guide fluid thereto.

19. Sheet-handling means comprising in combination, means for carrying a sheet edge from a stack of sheets and means for separating the sheet from other sheets in the stack, said separating means including a pivoted plate having a downwardly convex airfoil surface positioned adjacent the top of the sheet, the plate being free to move on its pivot, and means for directing a jet of air across said airfoil surface to cause it to move toward the sheet surface, whereby the flow of air is restricted to create a high pressure zone at the edge of the stack to force air between sheets to separate the top sheet from the stack.

20. Sheet-handling means comprising in combination, means for engaging and picking up sheets from the top of a stack of sheets, sheet-separating means, means controlled by engagement with a sheet picked up for setting said sheet-separating means into action, means for detecting the number of sheets picked up, means controlled by said detecting means for stopping the action of said sheet-separating means when a predetermined sheet thickness is detected, and action-limit means coordinated with the action of said detecting means for stopping the action of the sheet-handling means after a predetermined time if said detecting means has not sooner provided an indication that the predetermined number of sheets has been picked up.

21. Sheet-handling means comprising in combination, means for moving a sheet charge consisting of at least one sheet, means for detecting the number of sheets in said charge, action-limit means for stopping the action of the sheet-handling means after a predetermined time if the detecting means has not sooner provided an indication of a predetermined sheet charge, and means for stopping the action of the sheet-handling means if the detecting means is out of order.

22. Sheet-handling means comprising in combination, means for holding a stack of sheets, elevator means for picking up a sheet charge from the stack, transfer means for taking a sheet charge from said elevator means and moving it away, means for separating excess sheets on the elevator means, detecting means for stopping the action of said sheet-separating means when a predetermined sheet charge is detected, means for stopping the action of the elevator means and transfer means prior to the transfer point if a predetermined charge is not sooner detected, and plural means responsive to the presence of a sheet on said stack, on said elevator means, and on said transfer means for stopping the action of the sheet-handling means if a sheet is not present.

23. Sheet-handling means comprising in combination, means for presenting a sheet charge, means for separating excess sheets from the sheet charge, means for starting said sheet-separating means into action as the sheet charge is presented, detector means responsive to a character of the sheet charge for stopping the action of said sheet-separating means when a predetermined character is detected, and time-controlled means responsive to the action of said sheet-presenting means for stopping the sheet-presenting action at a predetermined point in the cycle if said detector means has not stopped the action of said sheet-separating means.

24. Sheet-handling means comprising in combination, a sheet-processing device, means for presenting sheets to said processing device, means for detecting the number of sheets on said sheet-presenting means, sheet-separating means for separating excess sheets from the sheet charge, interlocking means on said sheet-processing device and said sheet-presenting means for stopping either if the other is not operating and for cycling one if the other is cycled by a certain time, and means for stopping the action of said sheet-presenting means and said sheet-processing means after a given time interval if said detecting means has not stopped the action of said sheet-separating means, said sheet-separating means continuing in operation, and means for re-starting said sheet-presenting and sheet-processing means when said detector stops said sheet-separating means.

25. Sheet-handling means comprising in combination sheet-pickup means for adherently engaging and parting sheets from a stack of sheets and adherently holding the parted sheets in position for excess sheets, if any, to be returned to the stack, and means, other than the lifting means, responsive to sheet thickness and acting upon the parted sheets which are adherently held above the stack and while the sheets are being moved upward from the stack to give an indication of the number of sheets separated from the stack.

26. Sheet-handling means comprising in combination sheet-pickup means for adherently engaging and parting sheets from a stack of sheets and adherently holding the parted sheets in position for excess sheets, if any, to be returned to the stack, and means, other than the lifting means, responsive to sheet thickness and acting upon the parted sheets which are adherently held above the stack and while the sheets are being moved upward from the stack to give an indication of the number of sheets separated from the stack, said detecting means including a first means for indicating the presence of at least one sheet on the lifting means, and other means for detecting the presence of more than the predetermined sheet thickness.

References Cited in the file of this patent
UNITED STATES PATENTS

| | | |
|---|---|---|
| 1,063,037 | Jones | May 27, 1913 |
| 1,457,830 | Gerhardt | June 5, 1923 |
| 1,545,492 | Henderson | July 14, 1925 |
| 1,548,000 | Finigan | July 28, 1925 |
| 1,625,578 | Tremper | Apr. 19, 1927 |
| 1,911,884 | Darbaker | May 30, 1933 |
| 2,142,536 | Smith | Jan. 3, 1939 |
| 2,162,580 | Hopkins | June 13, 1939 |